US006606407B1

(12) United States Patent
Takahashi et al.

(10) Patent No.: US 6,606,407 B1
(45) Date of Patent: Aug. 12, 2003

(54) IMAGE PROCESSING APPARATUS, IMAGE PROCESSING METHOD AND MEMORY MEDIUM

(75) Inventors: Fumiaki Takahashi, Kawasaki (JP); Masakazu Matsugu, Chiba (JP); Toshiaki Kondo, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,968

(22) Filed: Jul. 28, 1999

(30) Foreign Application Priority Data

Jul. 31, 1998 (JP) .......................................... 10-217150

(51) Int. Cl.[7] .............................. G06K 9/68; G06K 9/00; G06K 9/46; H04N 9/64; H04N 9/76
(52) U.S. Cl. ....................... 382/164; 382/165; 382/190; 382/219; 348/587; 348/599
(58) Field of Search .................................. 382/282, 191, 382/165, 164, 162, 295, 291, 278, 224, 221, 219, 218, 209, 205, 195, 190, 172, 171, 170; 345/593, 589; 348/453, 587, 592, 599, 603; 358/538

(56) References Cited

U.S. PATENT DOCUMENTS

| | | | | |
|---|---|---|---|---|
| 5,222,154 A | * | 6/1993 | Graham et al. | 382/162 |
| 5,270,806 A | * | 12/1993 | Venable et al. | 358/500 |
| 5,333,243 A | * | 7/1994 | Best et al. | 358/1.9 |
| 5,355,443 A | * | 10/1994 | Kim et al. | 345/589 |
| 5,563,991 A | * | 10/1996 | Mahoney | 382/113 |
| 5,731,849 A | | 3/1998 | Kondo et al. | 348/699 |
| 5,838,938 A | * | 11/1998 | Morgan | 345/723 |

OTHER PUBLICATIONS

"Application of Color Information to Recognition of 3–Dimensional Objects", M. Yachida, et al., Bulletin of the Electrotechnical Laboratory, No. 35, pp. 308–315, 1971 (with English Abstract).

* cited by examiner

Primary Examiner—Jayanti K. Patel
Assistant Examiner—Yosef Kassa
(74) Attorney, Agent, or Firm—Fitzpatrick, Cella, Harper & Scinto

(57) ABSTRACT

There is provided configuration for enabling extraction of the concerned area with simple operations. An arbitrary position within the desired concerned area is designated by the position designation means, and the pixel color of the designated position is stored in the memory. The tolerable color difference setting means sets the initial color difference from the pixel color of the designated position as 0. The pixel group (within tolerable color difference) extraction means extracts the pixels within the tolerable color difference from all the pixels. The adjacent pixel group (within tolerable color difference) selective display means selectively displays the pixel group including the pixel of the designated position, based on the result of extraction by the extraction means. At each execution by the selective display means, the tolerable color difference setting means increases the tolerable color difference. Thereafter the extraction means and the selective display means repeat the execution. The means and repeat the execution until the end of process is instructed.

21 Claims, 23 Drawing Sheets

FIG. 4

| | |
|---|---|
| ORIGINAL IMAGE DATA STORAGE AREA | 80 |
| DESIGNATED-POSITION PIXEL COLOR STORAGE AREA | 82 |
| ADJACENT PIXEL GROUP (WITHIN TOLERABLE COLOR DIFFERENCE) SELECTIVE DISPLAY REPEATING PROGRAM STORAGE AREA | 84 |
| TOLERABLE COLOR DIFFERENCE SETTING PROGRAM STORAGE AREA | 86 |
| PIXEL GROUP (WITHIN TOLERABLE COLOR DIFFERENCE) EXTRACTION PROGRAM STORAGE AREA | 88 |
| COLOR DIFFERENCE CALCULATION PROGRAM STORAGE AREA | 90 |
| PIXEL GROUP (WITHIN TOLERABLE COLOR DIFFERENCE) STORAGE AREA | 92 |
| ADJACENT PIXEL GROUP (WITHIN TOLERABLE COLOR DIFFERENCE) EXTRACTION PROGRAM STORAGE AREA | 94 |
| ADJACENT PIXEL GROUP (WITHIN TOLERABLE COLOR DIFFERENCE) STORAGE AREA | 96 |
| ADJACENT PIXEL GROUP (WITHIN TOLERABLE COLOR DIFFERENCE) SELECTIVE DISPLAY PROGRAM STORAGE AREA | 98 |
| TOLERABLE COLOR DIFFERENCE STORAGE AREA | 100 |
| LABEL DATA STORAGE AREA | 102 |
| DESIGNATED POSITION STORAGE AREA | 104 |
| EXTRACTED AREA DISPLAY PROGRAM STORAGE AREA | 106 |

FIG. 18

| | |
|---|---|
| ORIGINAL IMAGE DATA STORAGE AREA | 80 |
| DESIGNATED-POSITION PIXEL COLOR STORAGE AREA | 82 |
| ADJACENT PIXEL GROUP (WITHIN TOLERABLE COLOR DIFFERENCE) SELECTIVE DISPLAY REPEATING PROGRAM STORAGE AREA | 84 |
| TOLERABLE COLOR DIFFERENCE SETTING PROGRAM STORAGE AREA | 86 |
| PIXEL GROUP (WITHIN TOLERABLE COLOR DIFFERENCE) EXTRACTION PROGRAM STORAGE AREA | 88 |
| COLOR DIFFERENCE CALCULATION PROGRAM STORAGE AREA | 90 |
| PIXEL GROUP (WITHIN TOLERABLE COLOR DIFFERENCE) STORAGE AREA | 92 |
| ADJACENT PIXEL GROUP (WITHIN TOLERABLE COLOR DIFFERENCE) EXTRACTION PROGRAM STORAGE AREA | 94 |
| ADJACENT PIXEL GROUP (WITHIN TOLERABLE COLOR DIFFERENCE) STORAGE AREA | 96 |
| ADJACENT PIXEL GROUP (WITHIN TOLERABLE COLOR DIFFERENCE) SELECTIVE DISPLAY PROGRAM STORAGE AREA | 98 |
| TOLERABLE COLOR DIFFERENCE STORAGE AREA | 100 |
| LABEL DATA STORAGE AREA | 102 |
| DESIGNATED POSITION STORAGE AREA | 104 |
| EXTRACTED AREA DISPLAY PROGRAM STORAGE AREA | 106 |
| REPRESENTATIVE POSITION SETTING PROGRAM STORAGE AREA | 140 |
| REPRESENTATIVE POSITION GROUP STORAGE AREA | 142 |
| MOUSE LOCUS POSITION GROUP STORAGE AREA | 144 |

FIG. 23

| | |
|---|---|
| ORIGINAL IMAGE DATA STORAGE AREA | 80 |
| DESIGNATED-POSITION PIXEL COLOR STORAGE AREA | 82 |
| ADJACENT PIXEL GROUP (WITHIN TOLERABLE COLOR DIFFERENCE) SELECTIVE DISPLAY REPEATING PROGRAM STORAGE AREA | 84 |
| TOLERABLE COLOR DIFFERENCE SETTING PROGRAM STORAGE AREA | 154 |
| PIXEL GROUP (WITHIN TOLERABLE COLOR DIFFERENCE) EXTRACTION PROGRAM STORAGE AREA | 88 |
| COLOR DIFFERENCE CALCULATION PROGRAM STORAGE AREA | 90 |
| PIXEL GROUP (WITHIN TOLERABLE COLOR DIFFERENCE) STORAGE AREA | 92 |
| ADJACENT PIXEL GROUP (WITHIN TOLERABLE COLOR DIFFERENCE) EXTRACTION PROGRAM STORAGE AREA | 94 |
| ADJACENT PIXEL GROUP (WITHIN TOLERABLE COLOR DIFFERENCE) STORAGE AREA | 96 |
| ADJACENT PIXEL GROUP (WITHIN TOLERABLE COLOR DIFFERENCE) SELECTIVE DISPLAY PROGRAM STORAGE AREA | 98 |
| TOLERABLE COLOR DIFFERENCE STORAGE AREA | 100 |
| LABEL DATA STORAGE AREA | 102 |
| DESIGNATED POSITION STORAGE AREA | 104 |
| EXTRACTED AREA DISPLAY PROGRAM STORAGE AREA | 106 |
| MODE DETECTION PROGRAM STORAGE AREA | 150 |
| MODE STORAGE AREA | 152 |

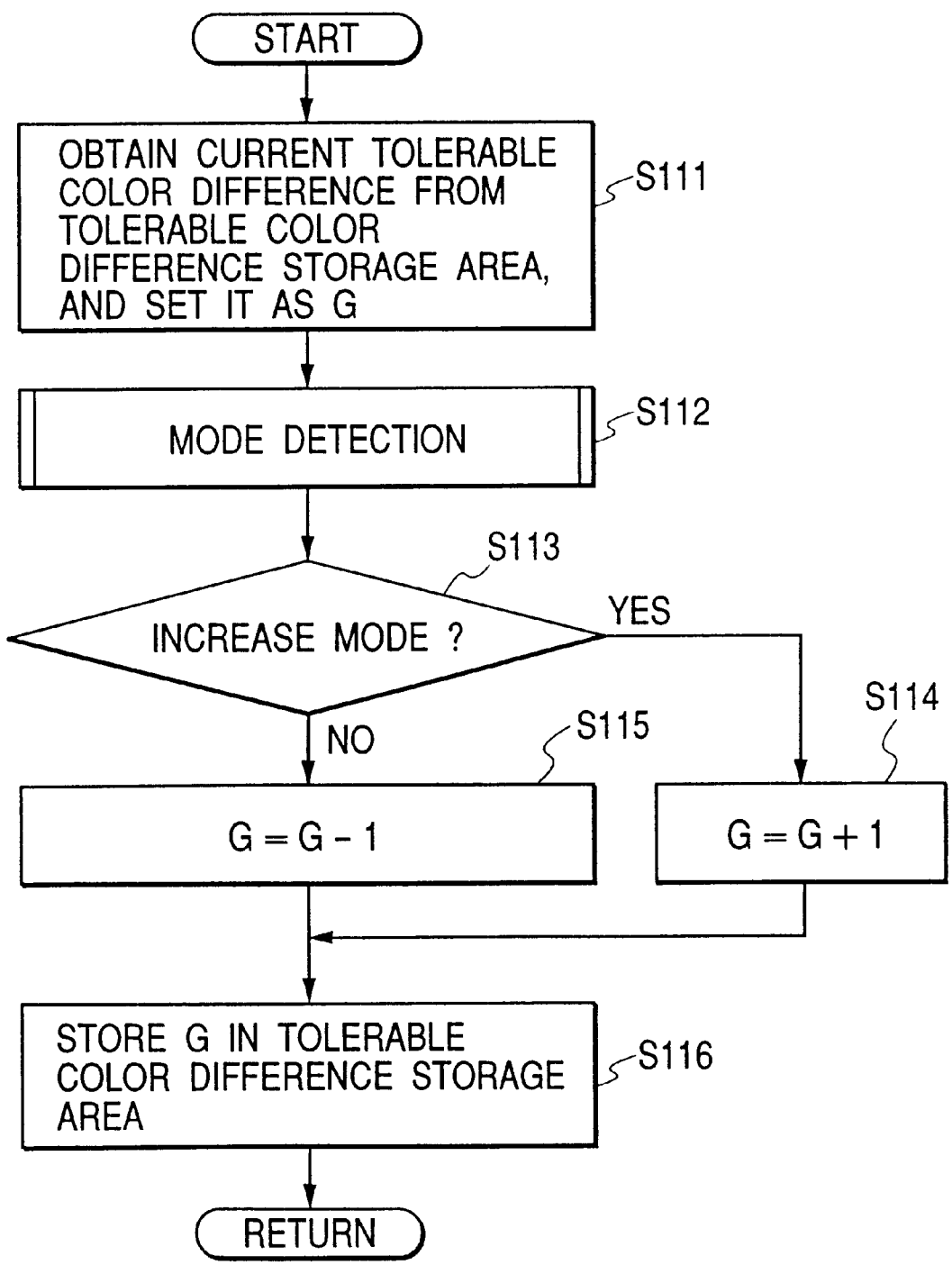

IMAGE PROCESSING APPARATUS, IMAGE PROCESSING METHOD AND MEMORY MEDIUM

BACKGROUND OF THE INVENTION

1. Field of the Invention

The present invention relates to an image processing apparatus, an image processing method and a memory medium therefor.

2. Related Background Art

In the image processing software, for selectively extracting a specified concerned area from an image, there is conventionally known a method of entering a range tolerable as color difference (tolerable color difference) by input means such as a keyboard, then designating a position in the image by position designation means, memorizing the color given by the pixel value corresponding to the designated position (designated position pixel color) and selecting, as a concerned area, a group of area constituted by pixels of which pixel values within the predetermined color difference from the pixel color of the designated position.

Referring to Tani, Uchida and Tsuji, "Utilization of color information for recognition of a three-dimensional object", Technical Report of Electronic Technology Institute, Vol. 35, pp. 308–315 (1971), employing for example chromaticity (r, g, b) for representing a color, the color difference between two colors C1 (r1, g1, b1) and C2 (r2, g2, b2) can be represented by a vector distance d. The distance d can be calculated for example by one of the following three equations:

$$\text{color difference} = [(r1-r2)^2 + (g1-g2)^2 + (b1-b2)^2] \quad (1)$$

$$\text{color difference} = |r1-r2| + |g1-g2| + |b1-b2| \quad (2)$$

$$\text{color difference} = \max\{|r1-r2|, |g1-g2|, |b1-b2|\} \quad (3)$$

In the following there will be explained the configuration and function of a concerned area extracting device realized in the representative conventional image processing software.

In the conventional concerned area extracting device, an original image constituting the target image for extracting the concerned area is stored in original image data storage means, and is displayed in image display means. In extracting an object in which the user is concerned from the image displayed on the image display means, the user enters a tolerable color difference that is necessary and sufficient for including the concerned area from the keyboard or sets a numerical value therefor. Then the user designates an arbitrary point in the concerned area with a position designating device such as a mouse, whereby the color of the concerned area is designated.

Then the color difference is calculated by comparing the color of each pixel within the image with that of the pixel at the designated position, and there are extracted pixels for which the calculated color difference is within the tolerable range. The extracted pixels are stored, as candidates of the pixels of the concerned area, in a predetermined memory device. From these candidates, there is extracted a group of pixels including the pixel of the previously designated position and the pixels adjacent thereto in succession. Thus extracted pixel group is determined as the concerned area and is displayed.

In such conventional configuration, since the user enters the range tolerable as the color difference (tolerable color difference) by the keyboard or the like and designates a pixel position contained in the concerned area on the image, the user has to estimate the tolerable color difference suitable for extracting the exact concerned area, prior to the designation of the pixel position. A failure in such estimation of the tolerable color difference may result in a failure in the extraction, such as extraction of an area far larger than the anticipated concerned area or an area only constituting a part of the anticipated concerned area. Such estimation of the tolerable color difference is difficult for the user who is unaccustomed with the image processing.

Also, if failing to extract the concerned area, the user has to repeat the cumbersome procedure of estimating and resetting the tolerable color difference and designating the pixel position.

SUMMARY OF THE INVENTION

In consideration of the foregoing, the object of the present invention is to provide an image processing apparatus, an image processing method and a memory medium therefor allowing to exactly extract the area in which the user is concerned by a simpler procedure.

The above-mentioned object can be attained, according to a preferred embodiment of the present invention, by an image processing method comprising:

a designation step of designating a position on an image;

a setting step of setting a color of a predetermined amount for the color of the position;

an area extracting step of extracting an area consisting of pixels of the color of the predetermined amount and adjacent to the position;

an extraction state display step of displaying the extraction state of the area extraction step in a distinguishable manner on a display unit; and a control step of repeating the area extracting step by varying the color of the predetermined amount according to the input of the operator.

Another object of the present invention is to provide a novel technology in the area extracting process.

Still other objects of the present invention, and the features thereof, will become fully apparent from the following description of the embodiments, to be taken in conjunction with the attached drawings.

BRIEF DESCRIPTION OF THE DRAWINGS

FIG. 4 is a memory map of a main memory 76 corresponding to the embodiment shown in FIG. 1;

FIG. 18 is a memory map of the main memory 76 when the embodiment shown in FIG. 16 is applied to the computer shown in FIG. 3;

FIG. 23 is a memory map of the main memory 76 when the embodiment shown in FIG. 22 is applied to the computer shown in FIG. 3;

FIG. 24 is a flow chart showing the details of tolerable color difference setting means 148 or a program therefor;

DESCRIPTION OF THE PREFERRED EMBODIMENTS

Now the present invention will be clarified in detail by preferred embodiments thereof with reference to the attached drawings.

Figure 1:
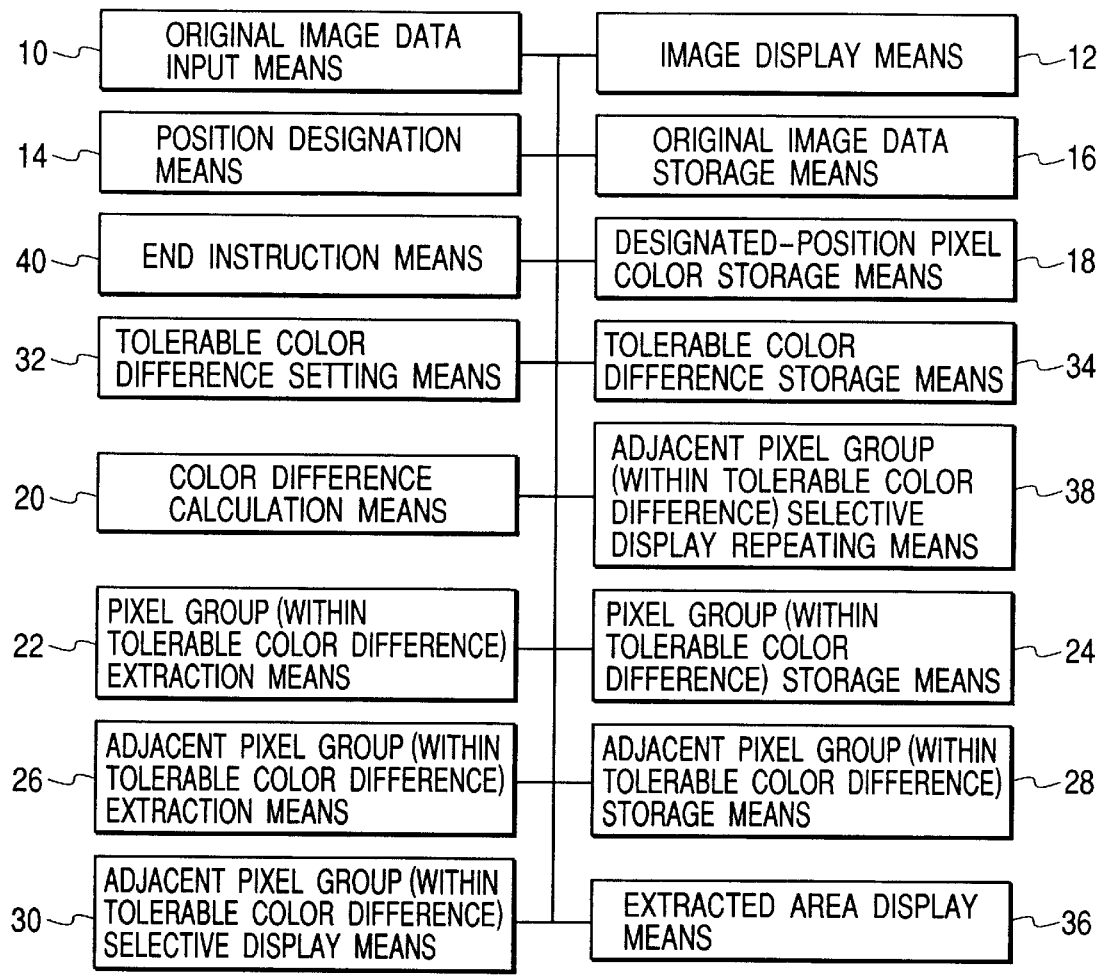
FIG. 1 is a schematic block diagram of a first embodiment of the present invention.

FIG. 1 is a schematic block diagram of an embodiment, wherein shown are original image data input means 10 for entering an original image; image display means 12; position designation means 14; original image data storage means 16 for storing the entered original image data; designated position pixel color storage means 18 for storing the color of the pixel of the designated position; color difference calculation means 20; pixel group (within tolerable color difference) extraction means 22 for extracting pixels within a tolerable color difference; pixel group (within tolerable color difference) storage means 24 for storing the pixel group extracted by the pixel group (within tolerable color difference) extraction means 22; adjacent pixel group (within tolerable color difference) extraction means 26 for extracting a pixel group including the pixel of the designated position within the pixel group stored in the pixel group (within tolerable color difference) storage means 24; adjacent pixel group (within tolerable color difference) storage means 28 for storing the pixel group extracted by the adjacent pixel group (within tolerable color difference) extraction means 26; and adjacent pixel group (within tolerable color difference) selective display means 30 for selectively displaying the adjacent pixel (within tolerable color difference) group stored in the adjacent pixel group (within tolerable color difference) storage means 28.

There are also provided tolerable color difference setting means 32 for calculating and automatically setting the tolerable color difference according to the current processing state; tolerable color difference storage means 34 for storing the tolerable color difference set by the tolerable color difference setting means 32; extracted area display means 36 for displaying the extracted concerned area; adjacent pixel group (within tolerable color difference) selective display repeating means 38 for repeating adjacent pixel group (within tolerable color difference) selective display; and end instruction means 40 for instructing end of various processes such as the adjacent pixel group (within tolerable color difference) selective display.

When the user designates a position by the position designation means 14, the tolerable color difference setting means 32 sets "0" as the initial value of the tolerable color difference, and adds "1" to the tolerable color difference at each execution of the adjacent pixel group (within tolerable color difference) selective display. Naturally the tolerable color difference may be varied stepwise by other methods or means.

Figure 2:
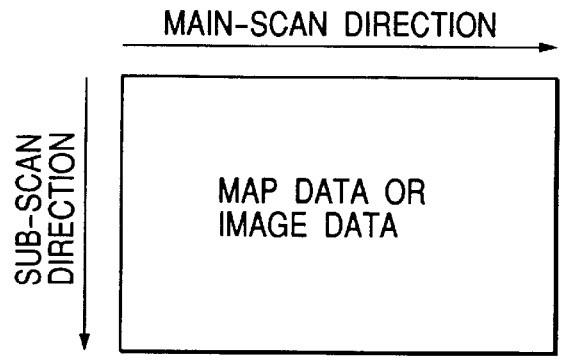
FIG. 2 is a view showing the scanning directions of an image.

In the present and ensuing embodiments, it is assumed, for the purpose of simplicity, that the two-dimensional data such as the original image and map data are scanned in the directions shown in FIG. 2. In case the original image is scanned in the scanning order shown in FIG. 2, the color of an n-th pixel is represented by RGB_ORG(n), composed of three color components of R (red), G (green) and B (blue), each having a value of 0 to 255. Consequently RGB_ORG (n) is a vector value having three components. The RGB components of the n-th pixel in the original image will be represented respectively as R_ORG(n), G_ORG(n) and B_ORG(n).

The pixel group (within tolerable color difference) storage means 24 stores the pixel group within tolerable color difference as map data of two values. The map data assume a value "1" in the pixel position constituting the pixel group within the tolerable color difference, and a value "0" in other pixel positions. For the purpose of simplicity, the above-mentioned map data will be referred to as pixel group (within tolerable color difference) map data AD_MAP. The map data at the pixel at the upper left corner will be represented as AD_MAP(1), and that of the n-th pixel in the scanning will be represented as AD_MAP(n).

Similarly the adjacent pixel group (within tolerable color difference) storage means 28 stores the adjacent pixel group within tolerable color difference as map data of two values. The map data assume a value "1" in the pixel position constituting the adjacent pixel group within the tolerable color difference, and a value "0" in other pixel positions. For the purpose of simplicity, the above-mentioned map data will be referred to as adjacent pixel group (within tolerable color difference) map data ADN_MAP. The map data at the pixel at the upper left corner will be represented as ADN_

MAP(1), and that of the n-th pixel in the scanning will be represented as ADN_MAP(n).

Figure 3:
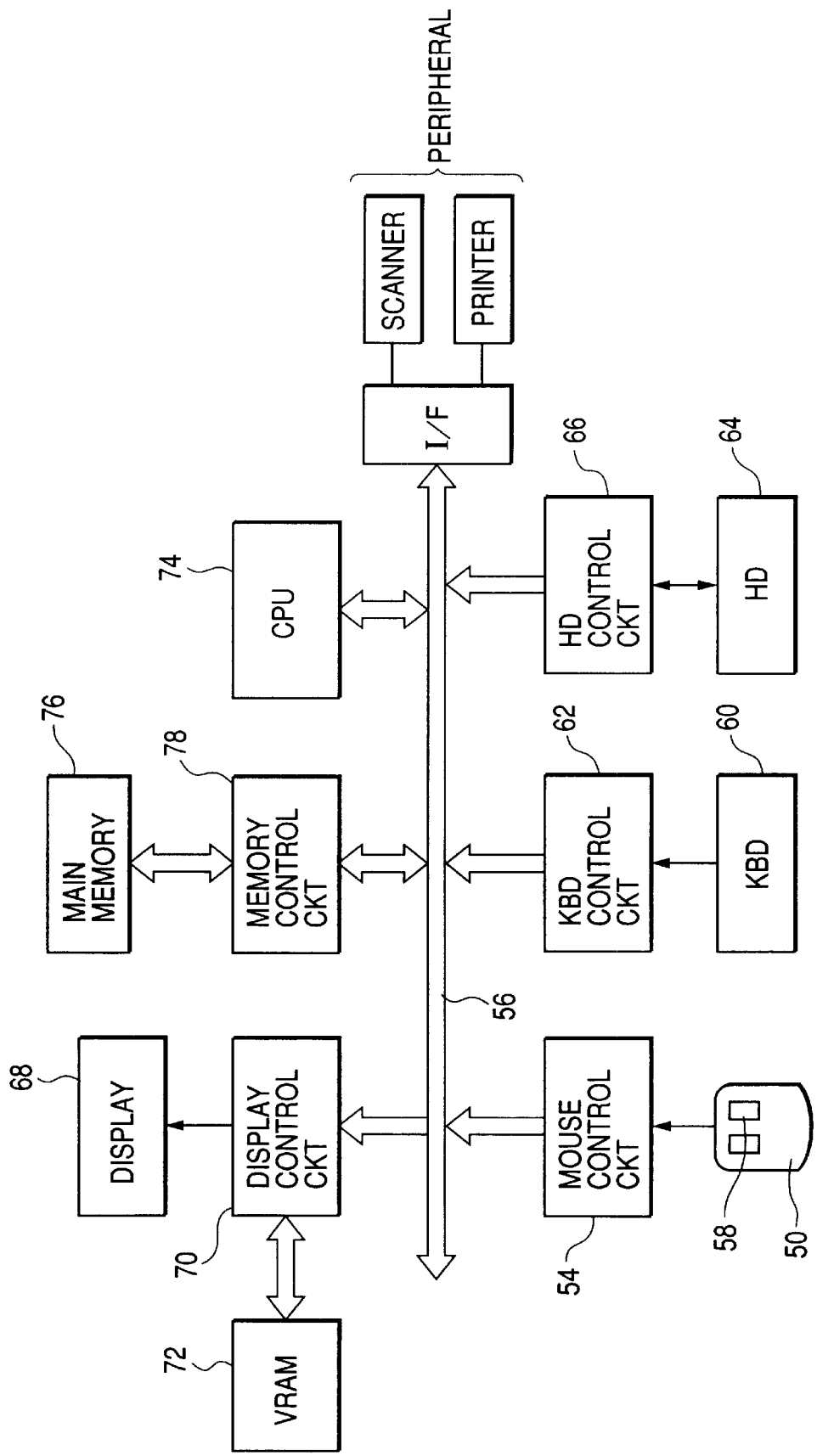
FIG. 3 is a hardware block diagram of a personal computer realizing the embodiment shown in FIG. 1 and other embodiments.

The present and ensuing embodiments are realized by various hardware resources of a personal computer and a program software functioning on the computer. FIG. 3 is a hardware block diagram of a personal computer realizing the present and ensuing embodiments. This personal computer has a very common configuration.

A mouse 50 is similar to the ordinary mouse employed for personal computers, and transmits positional information to an internal bus 56 through a mouse control circuit 54. The mouse 50 is provided with mouse buttons 58, of which operation information is transmitted to the internal bus 56 through the mouse control circuit 54. In the present embodiment, the mouse 50, the mouse buttons 58 and the mouse control circuit 54 realize the functions of the position designation means 14 and the end instruction means 40.

A keyboard 60 is similar to the ordinary keyboard currently employed in the personal computers and is provided with alphabet keys, numeral keys, a shift key, a control key etc. In response to the depression of a key by the user, a corresponding key code is transmitted through a keyboard control circuit 62 to the internal bus 56, whereby information of a text or a number can be entered.

A hard disk 64 constitutes an auxiliary memory and serves to store image data and text data from the internal bus 56 through a hard disk control circuit 66 or to release the stored data to the internal bus 56. The hard disk 64 stores the original image data formed in advance as a file. Such original image data are acquired for example by a digital camera, a digital camcorder or a scanner. The hard disk 64 and the hard disk control circuit 66 constitute the original image data input means 10.

An image display 68 such as a CRT or a liquid crystal display is connected to the internal bus 56 through a display control circuit 70, which, in response to a request from a CPU 74, writes image data into a VRAM 72 for storing the image data of an image frame of the display 68, and, also according to the request from the CPU 74, converts the image data stored in the VRAM 72 into RGB analog signal for supply to the display 68. The image displaying operation of the display 68 is similar to the ordinary image displaying operation in the current personal computers. The display 68, the display control circuit 70 and the VRAM 72 constitute the image display means 12.

A main memory 76 is connected to the internal bus 56 through a memory control circuit 78, which reads the data of an address designated by the CPU 74 from the main memory 76 to the internal bus 56 and stores the data on the internal bus 56 into the main memory 76 at an address designated by the CPU 74.

The CPU 74 executes various operations and controls the peripheral devices connected through interfaces, according to the data of a program stored in the main memory 76. The CPU 74 is composed of logic circuits, registers, cache memories etc., as in the ordinary CPU employed in the personal computers.

FIG. 4 shows the memory map of the main memory 76. An area 80 stores the original image data read for example from the hard disk 64.

An area 82 stores, as the designated position pixel color, the color information of the pixel of the position designated by the mouse 50 on the original image data displayed on the image display 68.

An area 84 stores a program for repeating the program for adjacent pixel group (within tolerable color difference) selective display. This program corresponds to the adjacent pixel group (within tolerable color difference) selective display means 38.

An area 86 stores a program for setting the tolerable color difference, and this program corresponds to the tolerable color difference setting means 32.

An area 88 stores a program for extracting the pixel group within the tolerable color difference, and this program corresponds to the pixel group (within tolerable color difference) extraction means 22.

An area 90 stores a program for calculating the color difference, and this program corresponds to the color difference calculation means 20.

An area 92 stores the information of the pixel group within the tolerable color difference, and this area 92 corresponds to the pixel group (within tolerable color difference) storage means 24.

An area 94 stores a program for extracting the adjacent pixel group within the tolerable color difference, and this program corresponds to the adjacent pixel group (within tolerable color difference) extraction means 26.

An area 96 stores the information of the adjacent pixel group within the tolerable color difference, and this area 96 corresponds to the adjacent pixel group (within tolerable color difference) storage means 28.

An area 98 stores a program for selectively displaying the adjacent pixel group within the tolerable color difference, and this program corresponds to the adjacent pixel group (within tolerable color difference) selective display means 30.

An area 100 stores the information of the tolerable color difference, and this area 100 corresponds to the color difference storage means 34.

An area 102 stores label data. This area is used for storing the label data in a labeling process for preparing the adjacent pixel group (within tolerable color difference) map data by dividing the pixel group (within tolerable color difference) map data.

An area 104 stores the position information designated by the user on the image.

An area 106 stores a program for displaying the extracted area, and this program corresponds to the extracted area display means 36.

Figure 5:
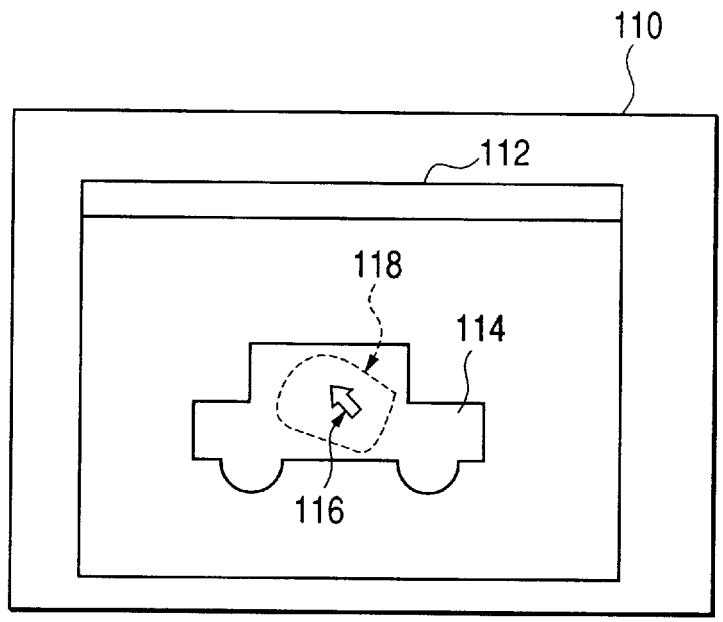
FIG. 5 is a view showing an example of the user interface displayed on a display 68 in the first embodiment.

FIG. 5 shows an example of the user interface displayed on the display 68, which displays the original image constituting the target image from which the concerned area is to be extracted.

A screen 110 of the display 8 corresponds to the image display means 12. A window 112 displayed on the screen 110 displays therein an image to be subjected to the extraction of the concerned area. As an example, an automobile 114 is assumed to the concerned area. A cursor 116 indicating the indicating position of the mouse 50, and the position can be designated by the position designation means 14 by depressing the mouse button 58 within the concerned area. A broken line 118 indicates the current boundary of the adjacent pixel group within the tolerable color difference.

Figure 6:
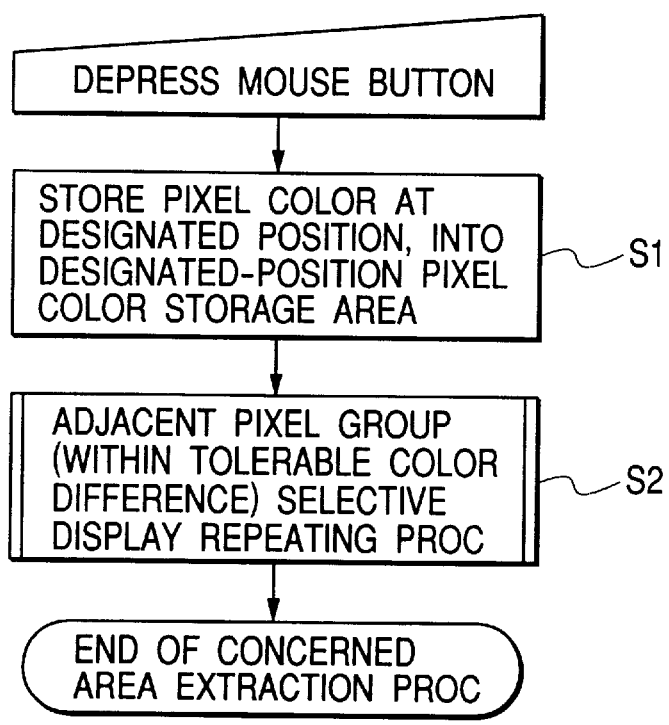
FIG. 6 is a flow chart of a concerned area extracting procedure in the first embodiment.

When the user positions the mouse cursor 116 within the concerned area 114 displayed on the user interface shown in FIG. 5 and depressed the mouse button 58, the current cursor position is stored in the designated position memory area 104 and the concerned area extraction process is initiated. FIG. 6 shows the flow chart of the concerned area extracting process.

The color of the pixel corresponding to the designated position stored in the designated position storage area 104 is stored as the designated position pixel color in the designated position pixel color storage area 82 (S1). The pixel color of the designated position is assumed, as an example, to be R=50, G=50 and B=50 in the RGB color space. Then executed is the program for repeating the adjacent pixel color (within tolerable color difference) selective display (S2).

Figure 7:
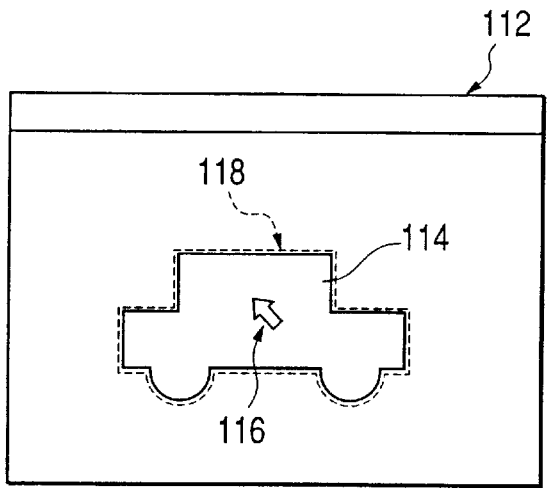
FIG. 7 is a view showing an example of image displayed on a window 112 at the end of a step S2 of repeating adjacent pixel group (within tolerable color difference) selective display.

FIG. 7 shows an example of the image displayed on the window 112 at the end of the adjacent pixel group (within tolerable color difference) selective display repeating step (S2). The broken line 118 indicating the boundary of the adjacent pixel group within the tolerable color difference is positioned at the boundary of the pixel group constituting the image of the automobile 114 to be extracted by the user, thus indicating that the automobile 114 is in the selected state.

If the concerned area for the user is properly selected as shown in FIG. 7 at the end of the concerned area extraction process shown in FIG. 6, the map data stored in the adjacent pixel group (within tolerable color difference) storage area 96 can be utilized as an image processing mask in the subsequent stages to achieve various image processes realized in the ordinary image processing softwares such as image cutout and synthesis, background painting, selective filtering in the selected area, and selective filtering outside the selected area.

Figure 8:
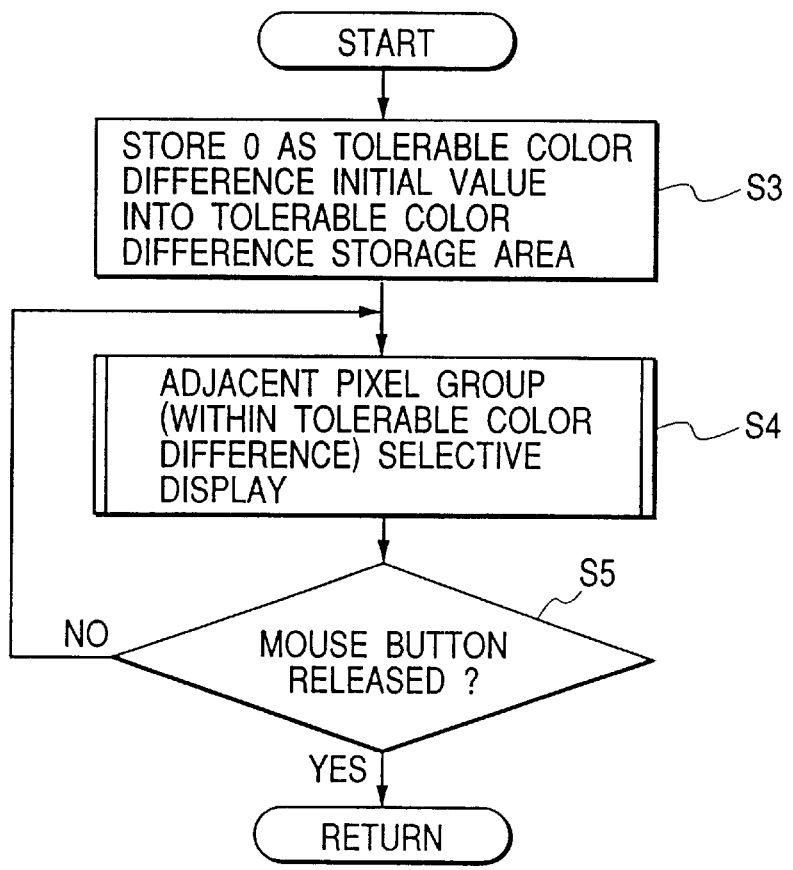
FIG. 8 is a flow chat showing the details of the step S2 of repeating adjacent pixel group (within tolerable color difference) selective display.

FIG. 8 is a flow chart showing the details of the adjacent pixel group (within tolerable color difference) selective display repeating step (S2). At first the initial value of the tolerable color difference is entered into the tolerable color difference storage area 100 (S3). In the present embodiment the initial value is "0". Then there is executed the program for adjacent pixel group (within tolerable color difference) selective display, stored in the area 98 (S4). The execution of the adjacent pixel group (within tolerable color difference) selective display is repeated (S4) until the mouse button 58 is released (S5). In the present embodiment, the releasing of the mouse button 58 is considered as the designation of the end of the adjacent pixel group (within tolerable color difference) selective display process by the user.

Figure 9:
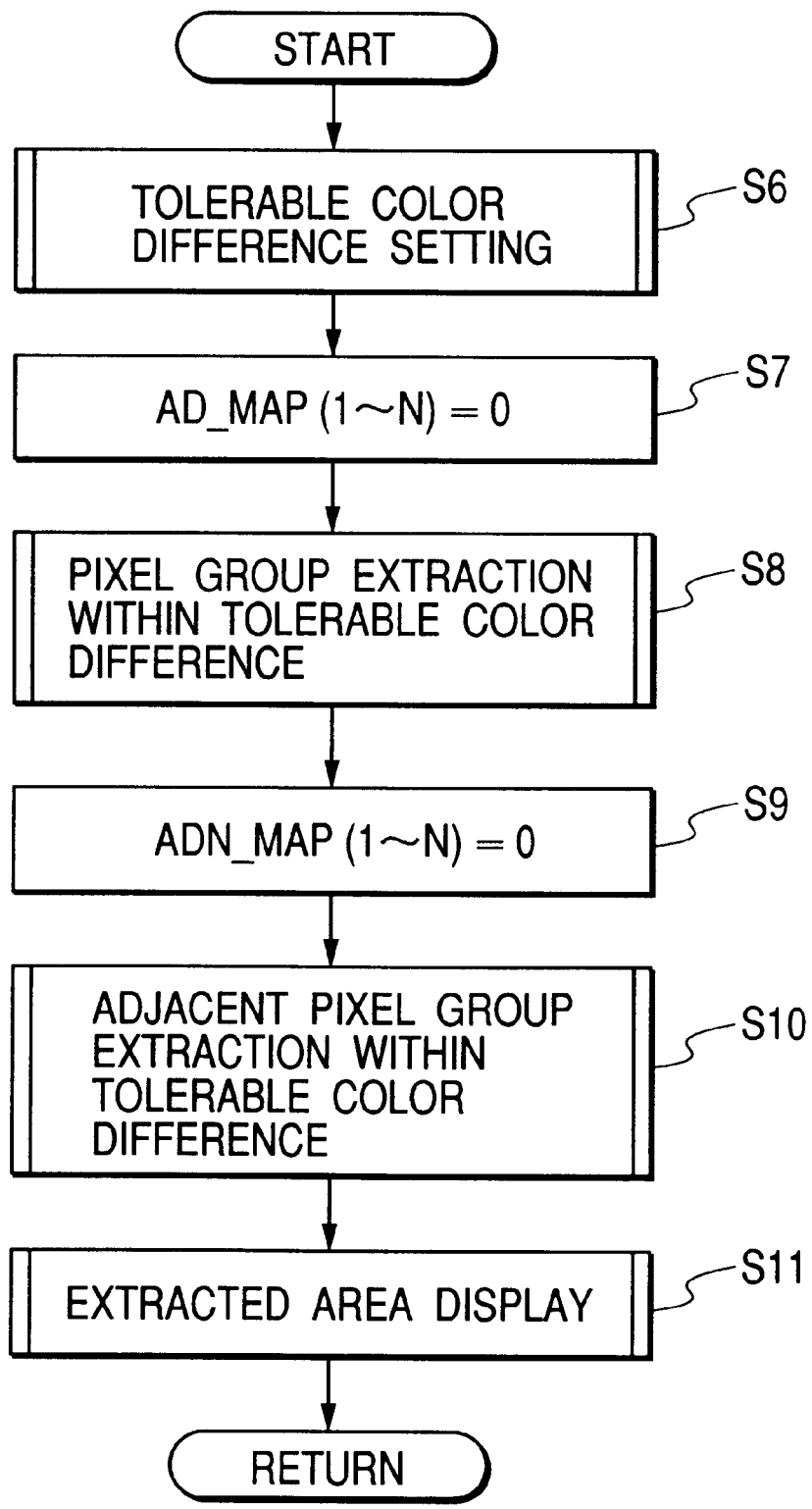
FIG. 9 is a flow chart showing the details of an adjacent pixel group (within tolerable color difference) display step (S4)

FIG. 9 is a flow chart showing the details of the adjacent pixel group (within tolerable color difference) selective display step (S4). At first the color difference setting program stored in the pixel group (within tolerable color difference) storage area 92 is executed (S6), and the map data AD_MAP stored in the pixel group (within tolerable color difference) storage area 92 for all the pixel are initialized to 0 (S7). If the current target image has pixels of a total number N, a value 0 is substituted in AD_MAP(1) to AD_MAP(N). Then executed is the pixel group (within tolerable color difference) extraction program stored in the area 88 (S8).

Then the map data ADN_MAP stored in the storage area 96 for all the pixels are initialized to 0 (S9). If the current target image has pixels of a total number N, a value 0 is substituted in ADN_MAP(1) to ADN_MAP(N). Then executed is the adjacent pixel group (within tolerable color difference) extraction program (S10).

Then executed is the extracted area display program stored in the area 106 to terminate the adjacent pixel group (within tolerable color difference) selective display program, whereupon the sequence returns to the original routine.

Figure 10:
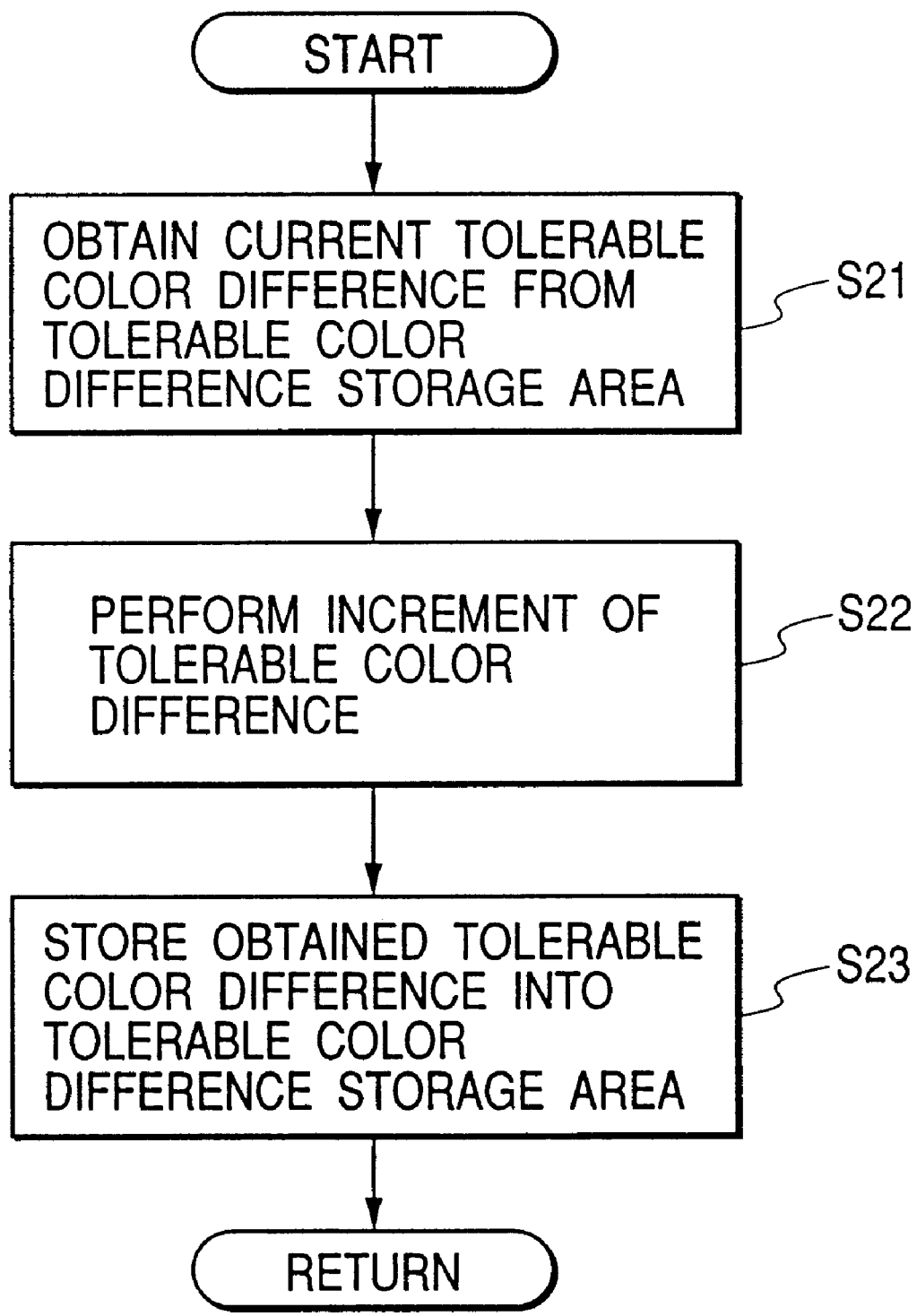
FIG. 10 is a flow chart showing the details of a tolerable color different setting step (S6)

FIG. 10 is a flow chart showing the details of the tolerable color difference setting step (S6). The current tolerable color difference is read from the tolerable color difference storage area 100 (S21), then a value "1" is added (S22) and the obtained value is stored as a new tolerable color difference in the tolerable color difference storage area 100 (S23).

In the present embodiment, the tolerable color difference is increased by one each time, but it may also be increase by 2 or by a larger value since the processing speed may be too slow for the user if the speed of calculation or the speed of display is not high enough. Therefore the unit of increment may be suitably selected in consideration of the processing ability and the speed of the display 68.

Also in the present embodiment, the tolerable color difference is increased by 1 at each execution of the adjacent pixel group (within tolerable color difference) selective display routine (S4) for the purpose of simplicity of the process, but it is also possible to set the new tolerable color difference by counting the number CountKS of repetition of the adjacent pixel group (within tolerable color difference) selective display routines and calculating the new tolerable color difference for example by:

new tolerable color difference=CountKS;
new tolerable color difference=CountKS×2; or
new tolerable color difference=CountKS×CountKS.

Thus the new tolerable color difference may be calculated by a function having a positive correlation to the CountKS. Thus there can be employed a function of position correlation, matching the performance of the apparatus and convenient for the user.

Figure 11:
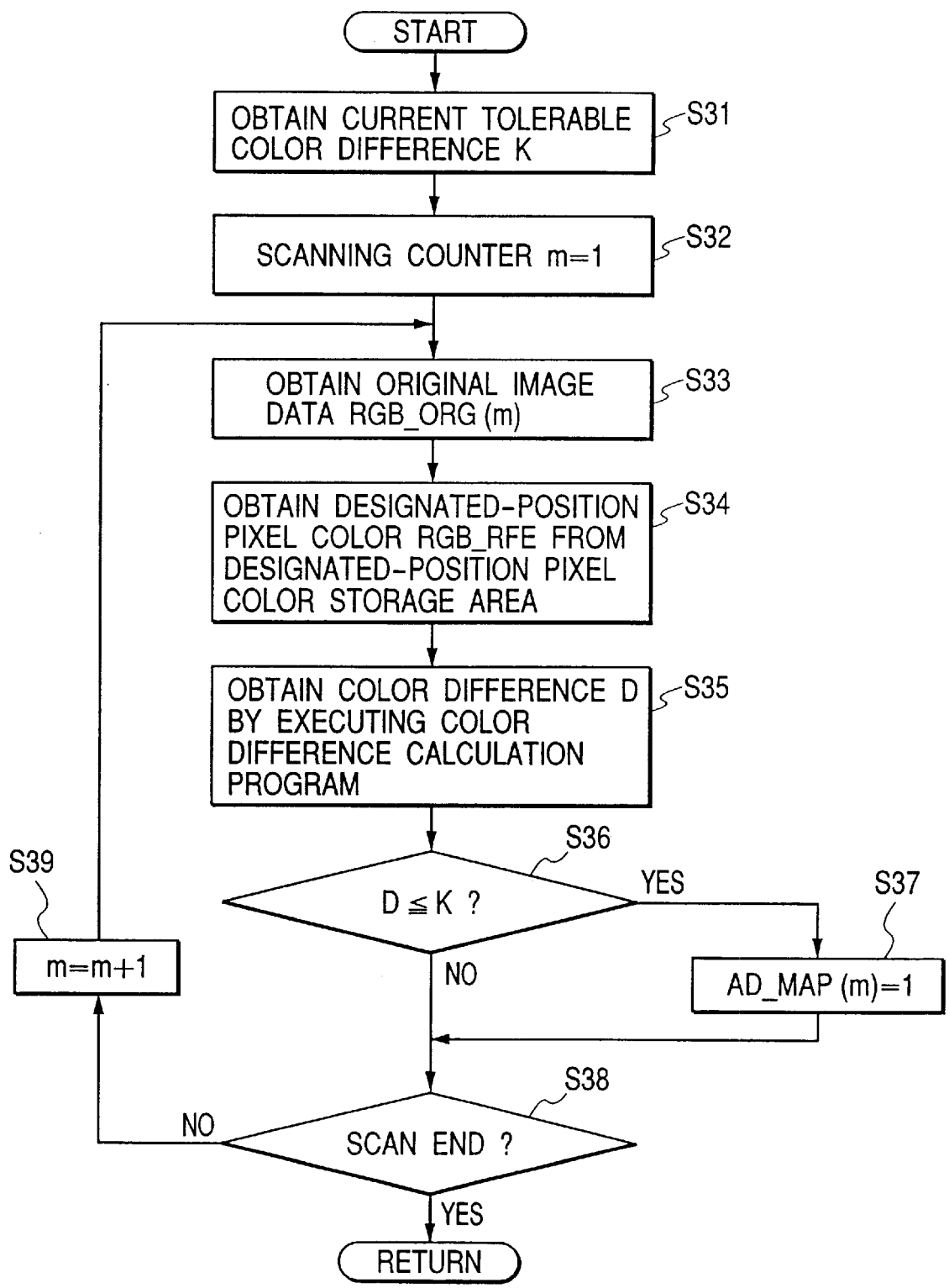
FIG. 11 is a flow chart showing the details of a pixel group (within tolerable color difference) extraction step (S8)

FIG. 11 is a flow chart showing the details of the pixel group (within tolerable color difference) extraction step (S8). There is at first acquired the tolerable color difference (K) stored in the tolerable color difference storage area 100 (S31). Then an initial value 1 is substituted in a variable m for counting the scanning position f the map data or the original image data (S32).

Then acquired the pixel color RGB_ORG(m) of the m-th pixel of the original image (S33), and the designated position pixel color RGB_REF if acquired from the designated position pixel color storage area 82 (S34). In the present embodiment, as the pixel color is a vector value having three components as explained in the foregoing, the RGB_REF is also a vector value having three components, which are represented by R_REF, G_REF, B_REF.

The color difference D is determined by executing the color difference calculation program stored in the area 90 (S35). In the present embodiment, the color difference calculation program determines the color difference D according to the foregoing equation (1). Thus the color difference calculation program executes:

$$D=(R\_REF-R\_ORG(C))^2+(G\_REF-G\_ORG(C))^2+(B\_REF-B\_ORG(C))^2$$

There is discriminated whether the calculated color difference D does not exceed the tolerable color difference K (S36), and, if D does not exceed K, the m-th pixel is judged as a pixel within the tolerable color difference and a value "1" is substituted in the m-th map data AM_MAP(m) of the pixel group within the tolerable color difference (S37). If D>K, the map data AM_MAP(m) remains at the initial value 0.

If all the pixels have not been processed (S38), the value m is increased (S39) to repeat the sequence after the step S33. If all the pixels have been processed (S38), the sequence returns to the original routine. For example, if the original image has a width of 100 and a height of 50, the scan ends at the pixel of lower right corner (100×50th or 5000th pixel) in the scanning order shown in FIG. 2, so that the step S38 discriminates whether m=5000.

Figure 12:
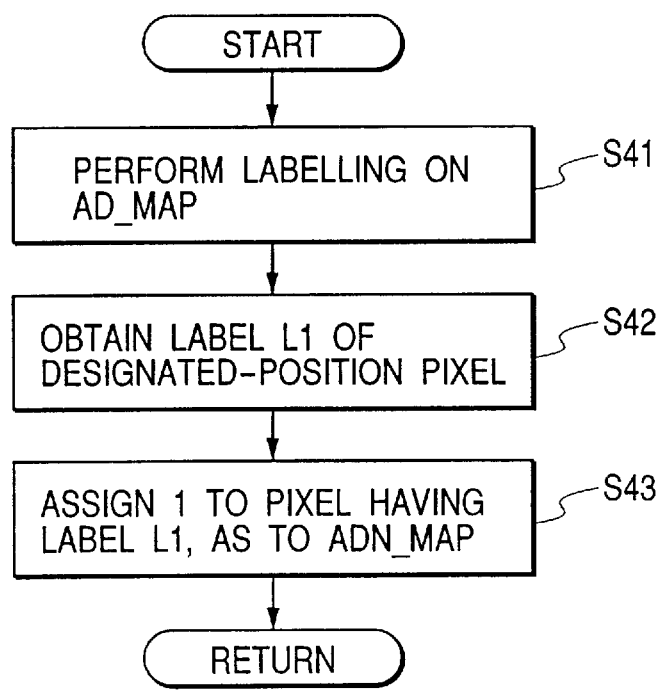
FIG. 12 is a flow chart showing the details of an adjacent pixel group (within tolerable color difference) extraction step (S10)

FIG. 12 is a flow chart showing the details of the adjacent pixel group (within tolerable color difference) extraction step S10. The step divides the map data AD_MAP representing the pixel group within the tolerable color difference into areas and extracts a pixel group, belonging to an area of the designated pixel corresponding to the positioned entered by the user, as the adjacent pixel group within the tolerable color difference.

At first the map data AD_MAP stored in the pixel group (within tolerable color difference) storage area 92 are labeled and the result of such labeling is stored in the label data storage area 102. The labeling may be executed by an ordinary method employed in the image processing algorithms. For example the simple area expansion method is known as a general labeling method, and the present embodiment employs such simple area expansion for labeling. The details of such simple area expansion method are explained in the "Image analysis handbook", 2.1.1. Simple Area Expansion, Tokyo University Publishing Association.

Referring to the label data prepared in the step S41, there is acquired the label value of the pixel corresponding to the designated position and stored in the designated position storage area 104 and the acquired label value is taken as L1 (S42). Then the label data prepared in S41 are scanned, and a value "1" is substituted in ADN_MAP, for the pixels having L1 label (S43).

At the completion of the step S43, the map data ADN_MAP have a value "1" in the pixels constituting the adjacent pixel group within the tolerable color difference and a value "0" in other pixels.

In the present embodiment, the adjacent pixel group (within tolerable color difference) extraction program extracts the adjacent pixel group within the tolerable color difference by labeling by simple area expansion and executing area division on the map data of the pixel group within the tolerable color difference, but such method is not restrictive. For example there may be adopted any algorithm capable of extracting, from the pixel groups within the tolerable color difference, those mutually adjacent and including the position designated by the user.

Figure 13:
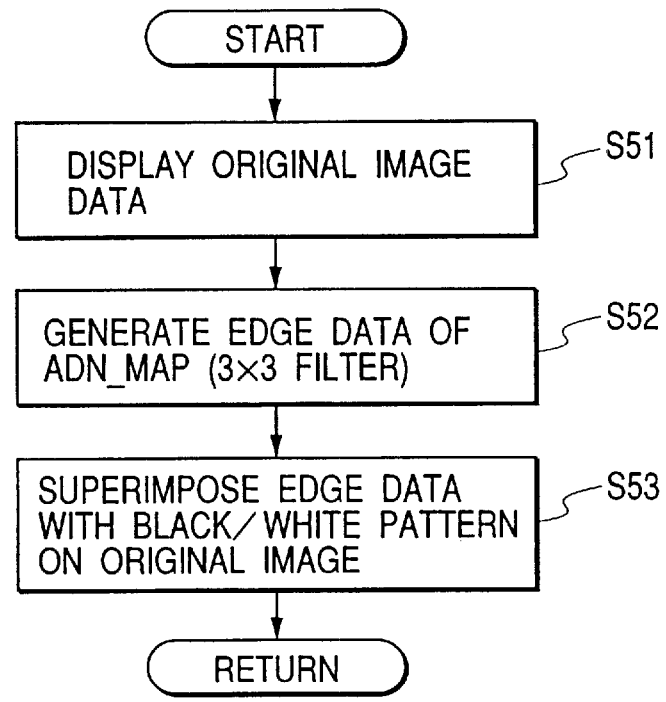
FIG. 13 is a flow chart showing the details of an extracted area display step (S11)

FIG. 13 is a flow chart showing the details of the extracted area display step S11. The original image data are displayed on the window 112 (S51). Then the edge data are prepared by applying an edge detection operator, defined by the following 3×3 matrix, to the map data ADN_MAP (S52). Since, in the data ADN_MAP, the non-zero values appear only in the vicinity of the boundary of the adjacent pixel group within the tolerable color difference, the boundary information of the adjacent pixel group within the tolerable color difference can be obtained by the edge detection. The edge detecting operator can for example be the following Laplacian coefficients, but such example is not restrictive:

$$\begin{bmatrix} 1, & 1, & 1 \\ 1, & -8, & 1 \\ 1, & 1, & 1 \end{bmatrix}$$

Then the edge data obtained in the step S52 are displayed by a suitable black-and-white pattern in superposition with the original image data on the window 112 (S53), whereupon the extracted area display routine is terminated.

In the present embodiment, the area of the extracted adjacent pixel group within the tolerable color difference is shown to the user by displaying the boundary area of the adjacent pixel group within the tolerable color difference extracted in the step S10, with a broken line in superposition with the original image, but such method is not restrictive. For example it is also possible to show the extraction state of the adjacent pixel group within the tolerable color difference to the user for example by inverting the color, varying the luminosity or varying the hue in the pixels corresponding to the adjacent pixel group within the tolerable color difference.

In the first embodiment, as explained in the foregoing, the user positions the mouse cursor in the concerned area and depresses the mouse button to designate the reference pixel color. After the designation of the position, the tolerable color difference setting means sets the tolerable color difference by selecting "0" as the initial value, and the tolerable color difference is increased by 1 at each repetition of the adjacent pixel group (within tolerable color difference) selective display routine. Thus the tolerable color difference can be selected as a value having positive correlation to the number Z of repetition of the adjacent pixel group (within tolerable color difference) selective display routine.

Therefore, after the designation by the user of a pixel position included in the concerned area, the area extracted and selected as the concerned area becomes wider around the designated position, with the repeated execution of the adjacent pixel group (within tolerable color difference) selective display routine. The user, watching the spreading of the area on the window 112, may release the mouse button when an appropriate selection state is reached. The releasing of the mouse button terminates the repetition of the adjacent pixel group (within tolerable color difference) selective display step, whereupon the extracted area no longer spreads. The present embodiment dispenses with the cumbersome operations of estimation and input of the tolerable difference required for proper selection of the concerned area and execution of the area extraction on trial-and-error basis, thereby enabling simple and appropriate extraction of the concerned area. Also the operability for expanding or reducing the boundary of the extracted area can be improved by increasing or decreasing the tolerable difference by one at each clicking of the mouse button.

Figure 14:
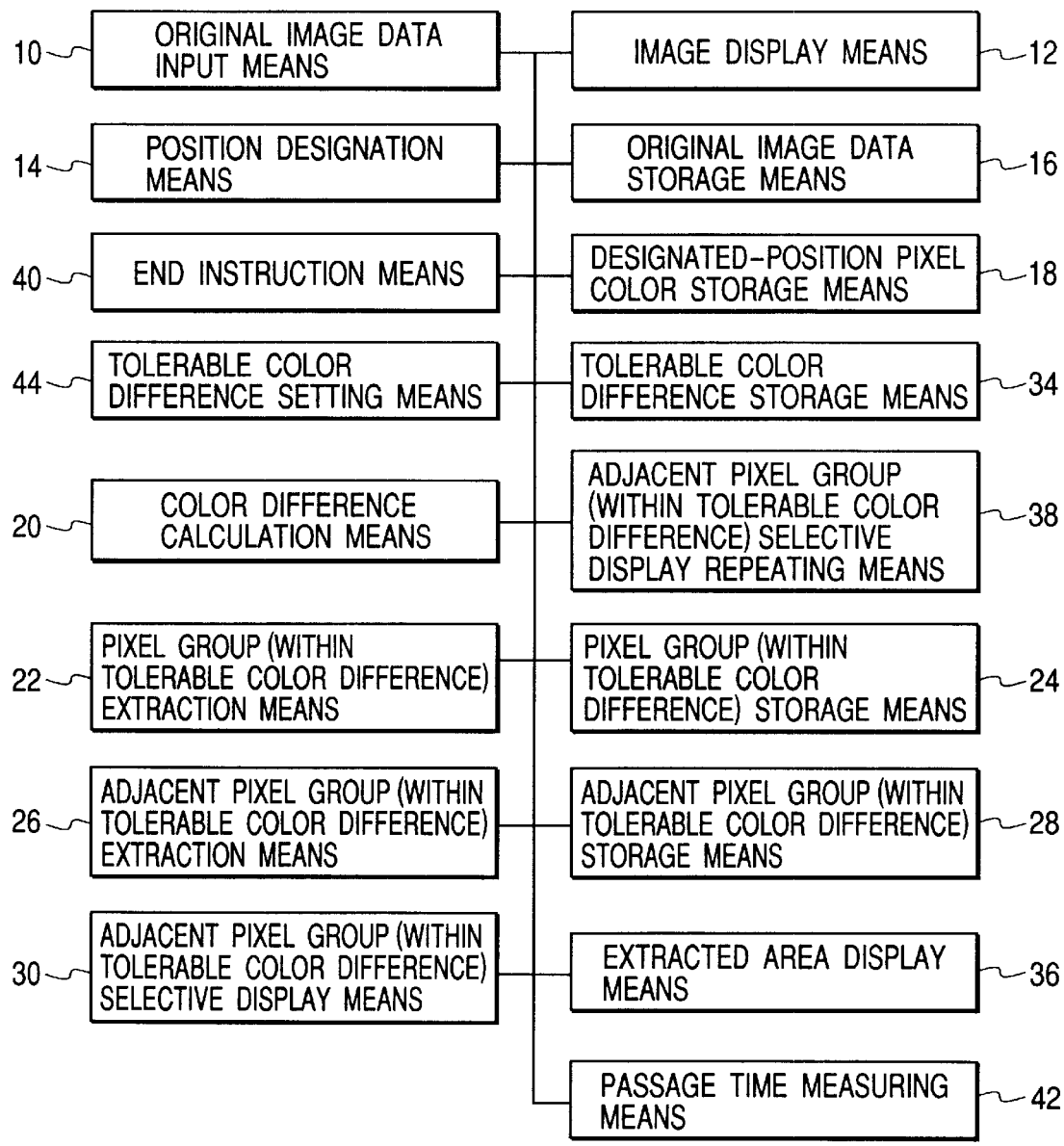
FIG. 14 is a schematic block diagram of a second embodiment of the present invention.

FIG. 14 is a schematic block diagram of a second embodiment. In contrast to the embodiment shown in FIG. 1, there is added elapsed time measuring means 42 for measuring or clocking the elapsed time T after the position designation by the user with the mouse 50 and the mouse button 58, and the tolerable color difference setting means 44 is adapted, in contrast to the tolerable color difference setting means 32, to calculate and set the tolerable color difference from the elapsed time T measured by the elapsed time measuring means 42. Other components same as those in FIG. 1 are represented by same numbers.

The recent personal computers are equipped with means corresponding to the elapsed time measuring means 42 and the function thereof can be easily realized with such recent personal computers.

Figure 15:
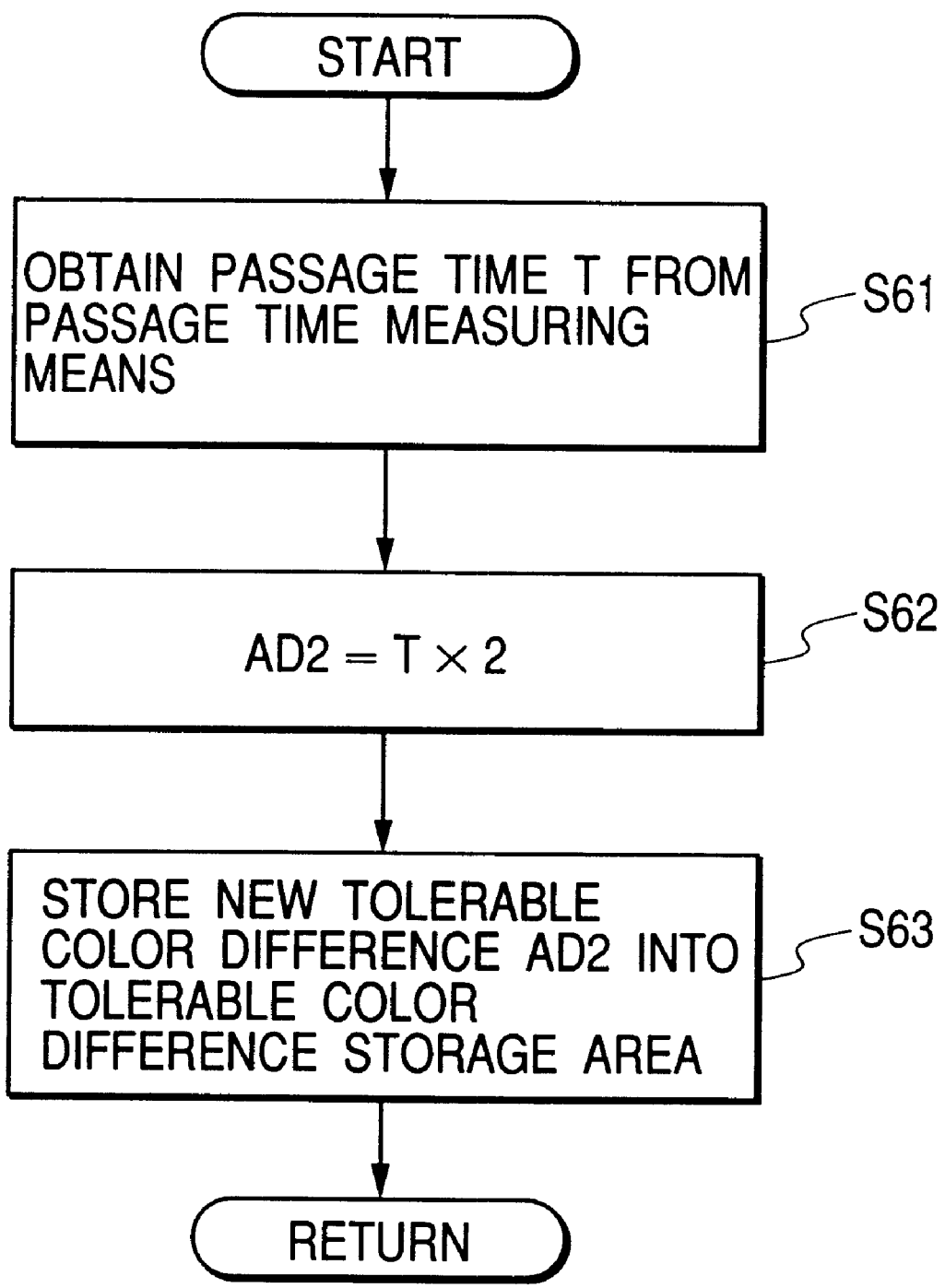
FIG. 15 is a flow chart showing the details of tolerable color difference setting means 44.

FIG. 15 is a flow chart showing the details of the tolerable color difference setting means 44. An elapsed time T from the depression of the mouse button 58 to the releasing thereof is acquired from the elapsed time measuring means 42 (S61), and a double of such time is selected as a new tolerable color difference AD2 (S62). The calculated tolerable color difference AD2 is stored in the tolerable color difference storage area 100 (S63), whereupon the sequence is terminated.

In FIG. 15, the new tolerable color difference AD2 is selected as the double of the elapsed time T, but it may be selected as triple or four times of T or as T×T. Stated differently, any value calculated by a function having positive correlation with the elapsed time T matches the principle of the present embodiment, and there may be selected any calculation formula convenient for the user in consideration of the calculating ability of the apparatus and the speed of display.

The second embodiment adopts a value positively correlated with the time T elapsing after the designation of position as the current tolerable color difference, so that the area selected as the concerned area gradually widens with the continuation of the designation of position. Therefore, when the boundary of the selected area gradually approaches the boundary of the desired concerned area and reaches the appropriate selection state, the user can terminate the position designating operation by releasing the mouse button. The present embodiment dispenses with the cumbersome operations of estimation and input of the tolerable difference required for proper selection of the concerned area and execution of the area extraction on trial-and-error basis, thereby enabling simple and appropriate extraction of the concerned area.

Figure 16:
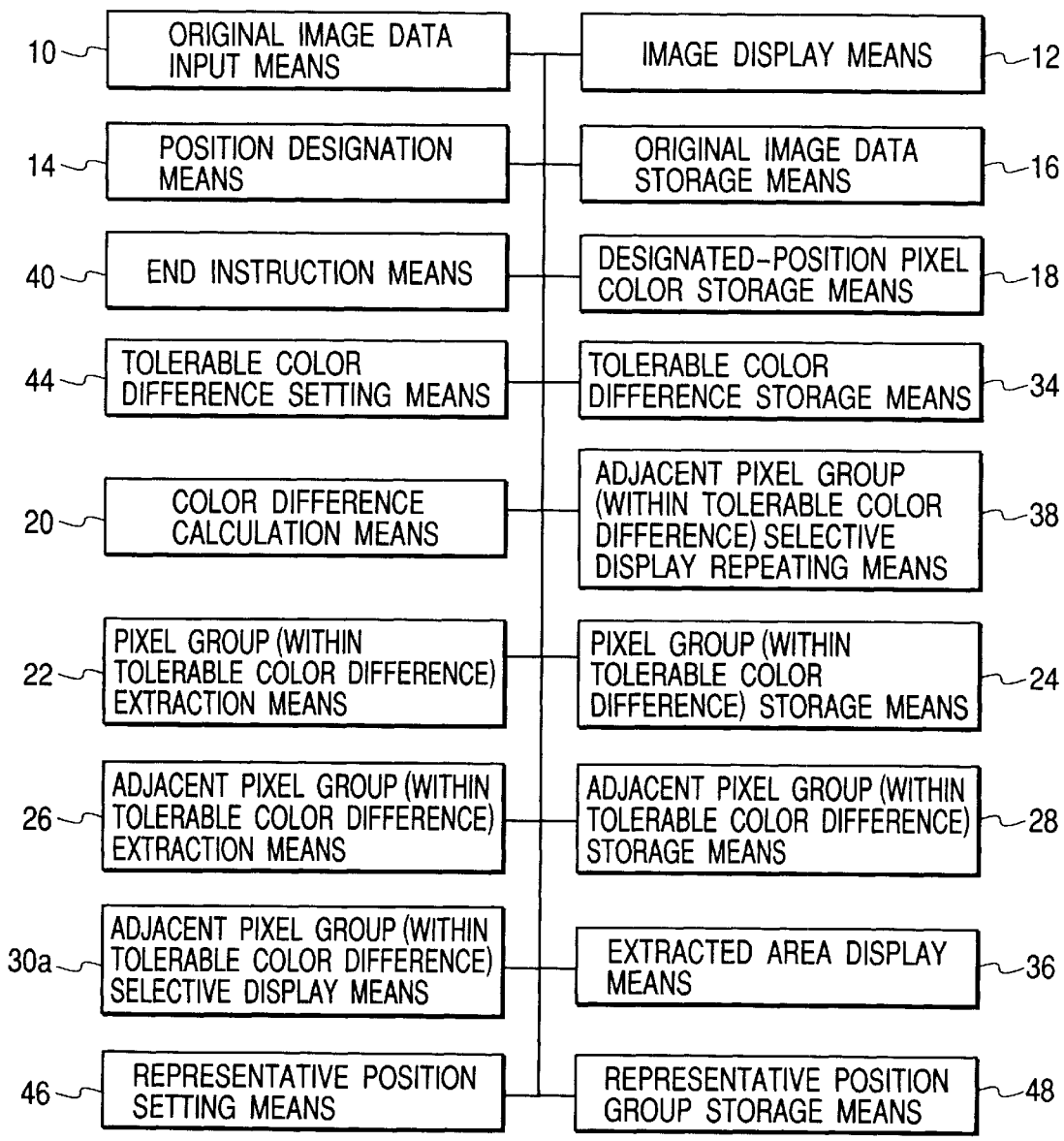
FIG. 16 is a schematic block diagram of a third embodiment of the present invention.

FIG. 16 is a schematic block diagram of a third embodiment, which is provided, in comparison with the embodiment shown in FIG. 1, additionally with representative position setting means 46 and representative position storage means 48. In the designation of a position in the image by the position designation means 14, if the user designates a line or a plane composed of plural points instead of a single point, the representative position setting means 46 selects, from such plural position, plural representative positions as a sub set to be used for extracting the concerned area and stores such sub set in the representative position storage means 48. For the purpose of simplicity, thus selected plural representative positions will be hereinafter called the representative position group. The selection of the sub set is merely for reducing the process time required for extracting the concerned area, and all the designated position may be selected as the representative positions for obtaining more exact result of extraction of the concerned area if sufficient calculating ability is available.

In the embodiment shown in FIG. 16, the adjacent pixel group (within tolerable color difference) selective display means 30a is slightly different in the process from the adjacent pixel group (within tolerable color difference) selective display means 30 in the embodiment shown in FIG. 1. The difference will be explained in more details in the following.

The present embodiment is different from the embodiment shown in FIG. 1 in the method of position designation. More specifically, in the present embodiment, the user draws a closed line or plane so as to include the concerned area on the image.

The present embodiment is same in other aspects as the embodiment shown in FIG. 1.

Figure 17:
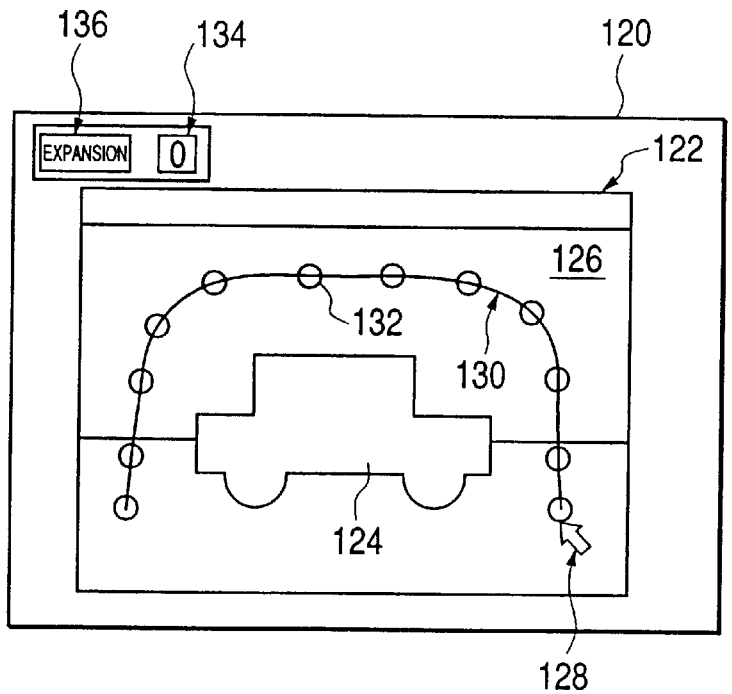
FIG. 17 is a view showing an example of the user interface in the embodiment shown in FIG. 16.

FIG. 17 is a view showing an example of the user interface in the embodiment shown in FIG. 16. There are shown a screen 120 of the image display means 12 and a window 122 displayed on the screen 120. In the window 122 there is displayed an image to be subjected to the extraction of the concerned image. In the illustrated example, the background 126 other than the automobile 124 is assumed to be the concerned area. There is also shown a mouse cursor 128. The position is designated by a line, by moving the mouse cursor in a part of the background 126 while the mouse button is depressed (so-called dragging). In FIG. 17, the trajectory of the mouse cursor 128 is represented by a solid line 130. Also in FIG. 17, white circles 132 indicate the plural positions constituting the representative position group stored in the representative position storage means 48.

A tolerable color difference display field 134 displays the tolerable color difference value stored in the tolerable color difference storage means 34.

There is also shown an expansion button 136. The concerned area extraction process is initiated, after the position designation with a line by the user, by positioning the mouse cursor 128 on the expansion button 136 and depressing the mouse button. The displayed button is an element for entering an instruction into the computer, by positioning the mouse cursor 128 thereon and depressing or releasing the mouse button.

FIG. 18 shows a memory map of the main memory 76 when the embodiment shown in FIG. 16 is applied to the computer shown in FIG. 3. Components same as those in FIG. 4 are represented by same numbers.

An area 140 stores a representative position setting program corresponding to the representative position setting means 46. An area 142 is a representative position storage area for storing the representative position group set by the representative position setting means 46, corresponding to the representative position storage means 48. The representative position is designated by the sequential order of scanning in the scanning direction shown in FIG. 2, and the representative position storage area 142 stores such sequential order of scanning in an array.

A mouse locus position group storage area 144 stores, in an array, the trajectory position of movement of the mouse cursor 128 when the user executes the above-described dragging operation on the window 122. In the present embodiment, the position of the mouse cursor 1128 is designated by the sequential number of pixel in the scanning operation of the image shown in FIG. 2, and the mouse locus position group storage area 144 stores the sequential order of scanning in an array.

Figure 19:
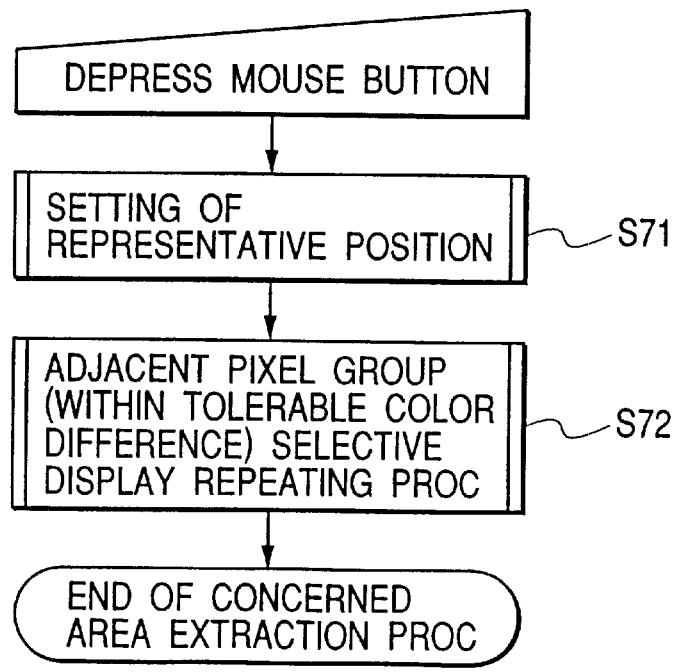
FIG. 19 is a flow chart of a main routine of the embodiment shown in FIG. 3.

FIG. 19 is a flow chart showing the main routine of the present embodiment. When the mouse button is depressed while the mouse cursor 128 is positioned on the expansion button 136, there is executed a representative position setting program stored in the representative position program storage area 140 (S71). Then there is executed the adjacent pixel group (within tolerable color difference) selective display repeating program stored in the area 84 (S72), whereby the concerned area extraction process is terminated.

In the present embodiment, the background area 126 is extracted as the concerned area, but there can be prepared a mask for the target area by inverting "1" and "0" on the map data stored in the adjacent pixel group (within tolerable color difference) storage area 96.

Figure 20:
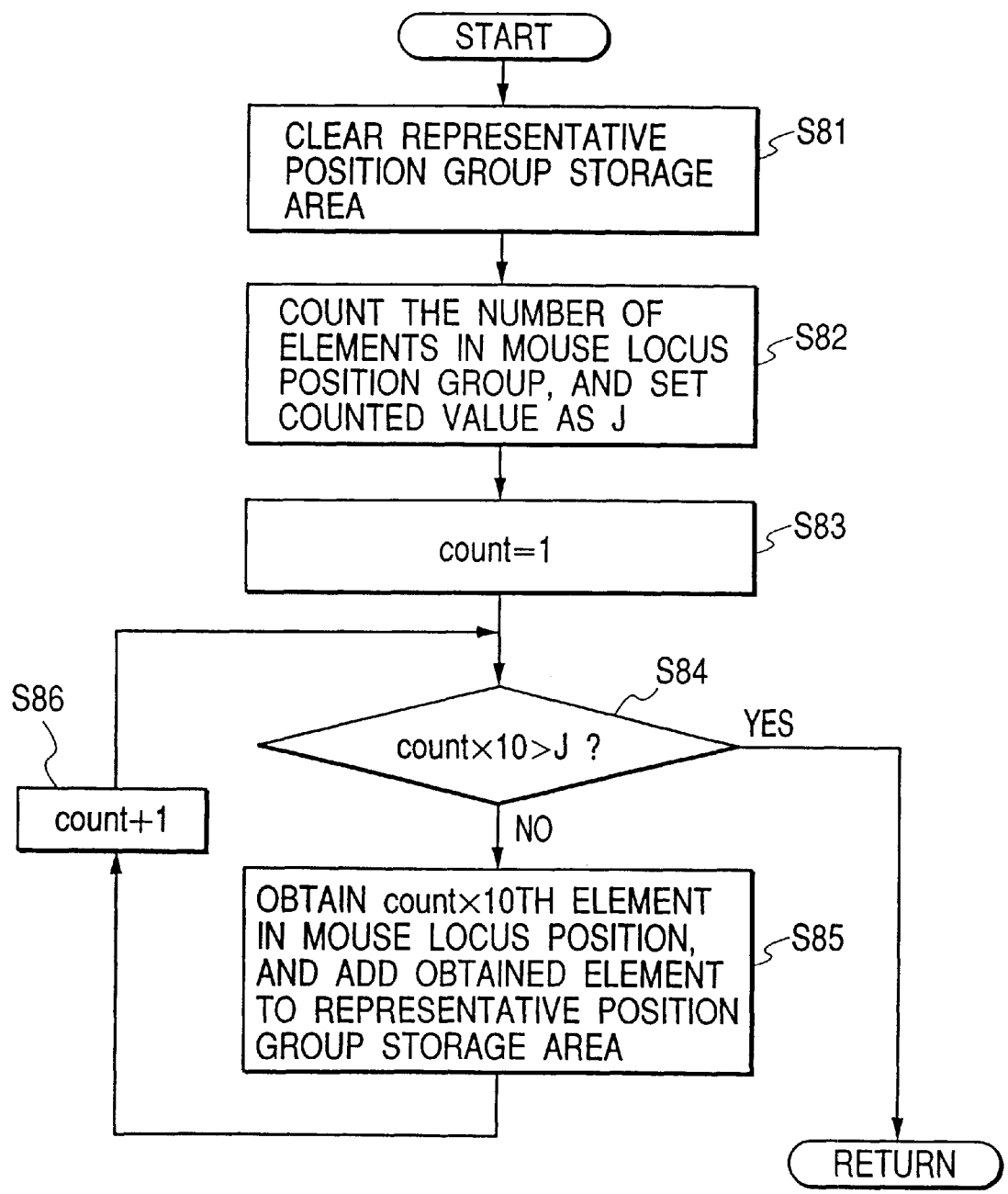
FIG. 20 is a flow chart showing the details of a representative position setting process (S19) in FIG. 19.

FIG. 20 is a flow chart showing the details of the representative position setting process (S19) in FIG. 19. At first the representative position group storage area 142 is cleared (S81). Then there is counted the number J of elements in the mouse position array stored in the mouse locus position group storage area 144 (S82).

A value "1" is substituted in a counter variable Count (S83), and there is discriminated whether Count×10 is larger than J (S84). If Count×10 does not exceed J (S84), the element at the sequential order of Count×10 is acquired from the mouse locus position group storage area 144, and is added to the end of the array in the representative position group storage area 142 (S85). Then the value of variable Count is increased by one (S86) and the sequence returns to the step S84. When the Count×10 exceeds J (S84), the representative position setting routine is terminated.

In the flow chart shown in FIG. 20, the representative position is obtained by taking every 10th position in the mouse trajectory, but such method is not restrictive. There may be adopted other methods such as sampling the logic distance on the image at a constant interval.

Figure 21:
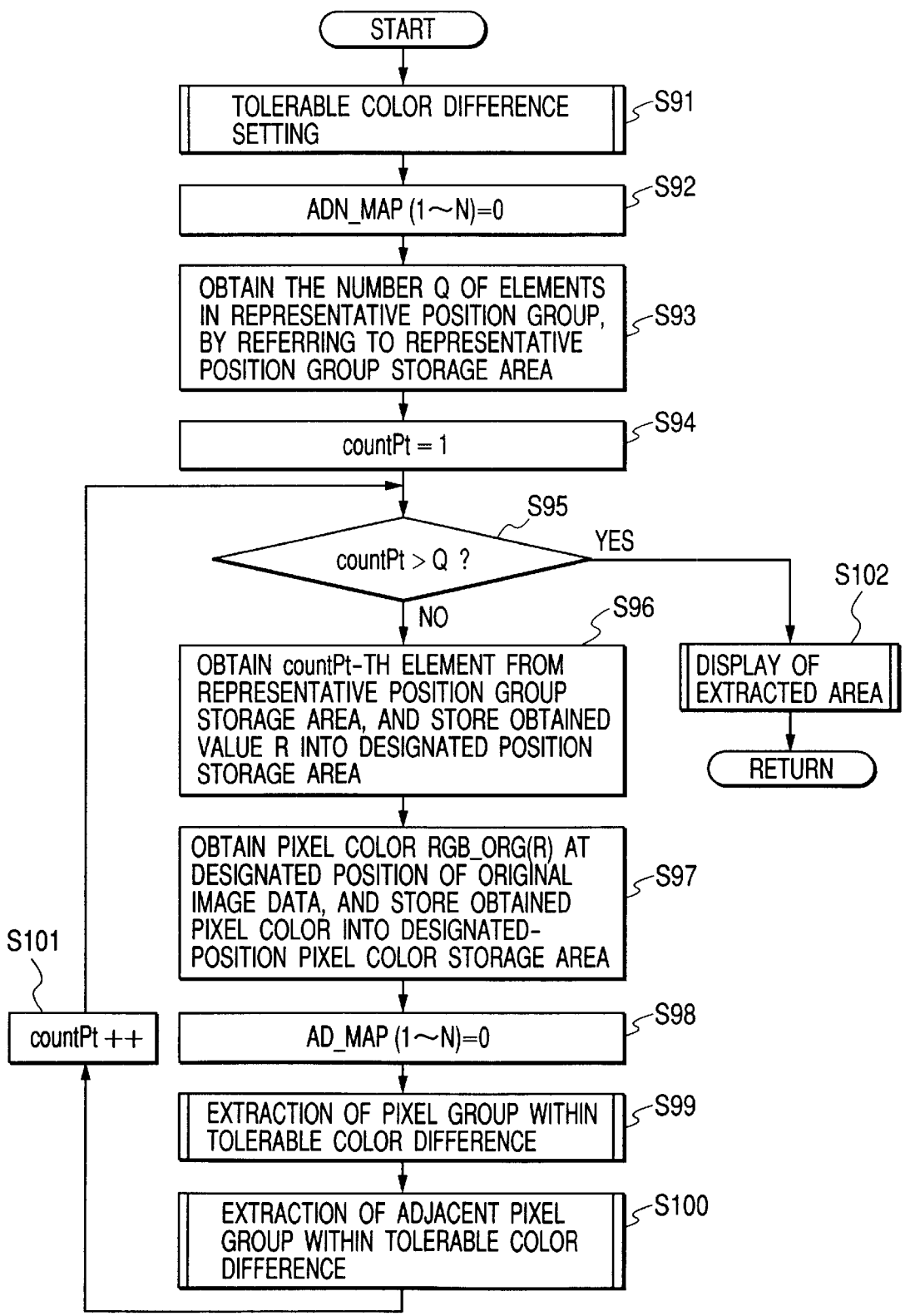
FIG. 21 is a flow chart of a process of selectively displaying an adjacent pixel group (within tolerable color difference) in the embodiment shown in FIG. 16.

The adjacent pixel group (within tolerable color difference) selective display repeating process (S72) in FIG. 19 is basically same as the adjacent pixel group (within tolerable color difference) selective display repeating process (S2) explained in the foregoing. However the adjacent pixel group (within tolerable color difference) selective display process (S4) therein is altered as shown in FIG. 21.

At first there is executed the tolerable color difference setting program stored in the area 86 (S91), and the map data ADN_MAP stored in the area 96 are initialized for all the pixels to 0 (S92). Then the number Q of elements of the representative position group is acquired by referring to the representative position group storage area 142 (S93). An initial value 1 is substituted in the counter variable countPt (S94).

Then there is discriminated whether the variable countPt is larger than Q (S95). If countPt is larger than Q (S95), all the positions stored in the representative position group storage area 142 have been processed, so that the extracted area display step is executed (S102) whereupon the sequence is terminated.

If the variable countPt does not exceed Q (S95), there remains an unprocessed representative position. Therefore there is acquired the value (R) of the element of the sequential order of countPt by referring to the representative position group storage area 142, and this value is stored in the designated position storage area 104 (S96). Then acquired is the pixel color RGB_ORG(R) of the original image data at the designated position by referring to the original image data storage area 80, and the pixel color is stored in the designated position pixel color storage area 82 (S97). Then the map data AD_MAP stored in the pixel group (within tolerable color difference) storage area 92 are initialized for all the pixels to 0 (S98). Then there are executed the pixel group (within tolerable color difference) extraction program stored in the area 88 (S99), and the adjacent pixel group (within tolerable color difference) extraction program stored in the area 94 (S100). After the increment of the variable countPt by 1, the sequence returns to the step S95.

As explained in the foregoing, the third embodiment stores plural positions on the line entered by the user on the image and selects, from such plural positions, the representative position group to be utilized for extracting the concerned area. Then repeated is the adjacent pixel group (within tolerable color difference) selective display process for each representative position, and the sum of the adjacent pixel groups (within tolerable color difference) extracted from the representative positions is extracted as the adjacent pixel group within the tolerable color difference corresponding to the entered line. It is thus rendered possible to extract plural areas collectively, without cumbersome procedure, even in case the concerned area of the object image is composed of a plurality of areas. Stated differently, there can be dispensed with the cumbersome procedure of repeating the extraction of the concerned area and taking the sum of the masks prepared from the results of extractions as the mask for the concerned area.

In the present embodiment, the user enters a line and the representative position group is selected from thus entered line, but such method is not restrictive. For example there can be utilized any method allowing to enter plural positions. The representative position group may be selected from the pixel group in an area surrounded by a closed loop entered by mouse dragging.

Figure 22:
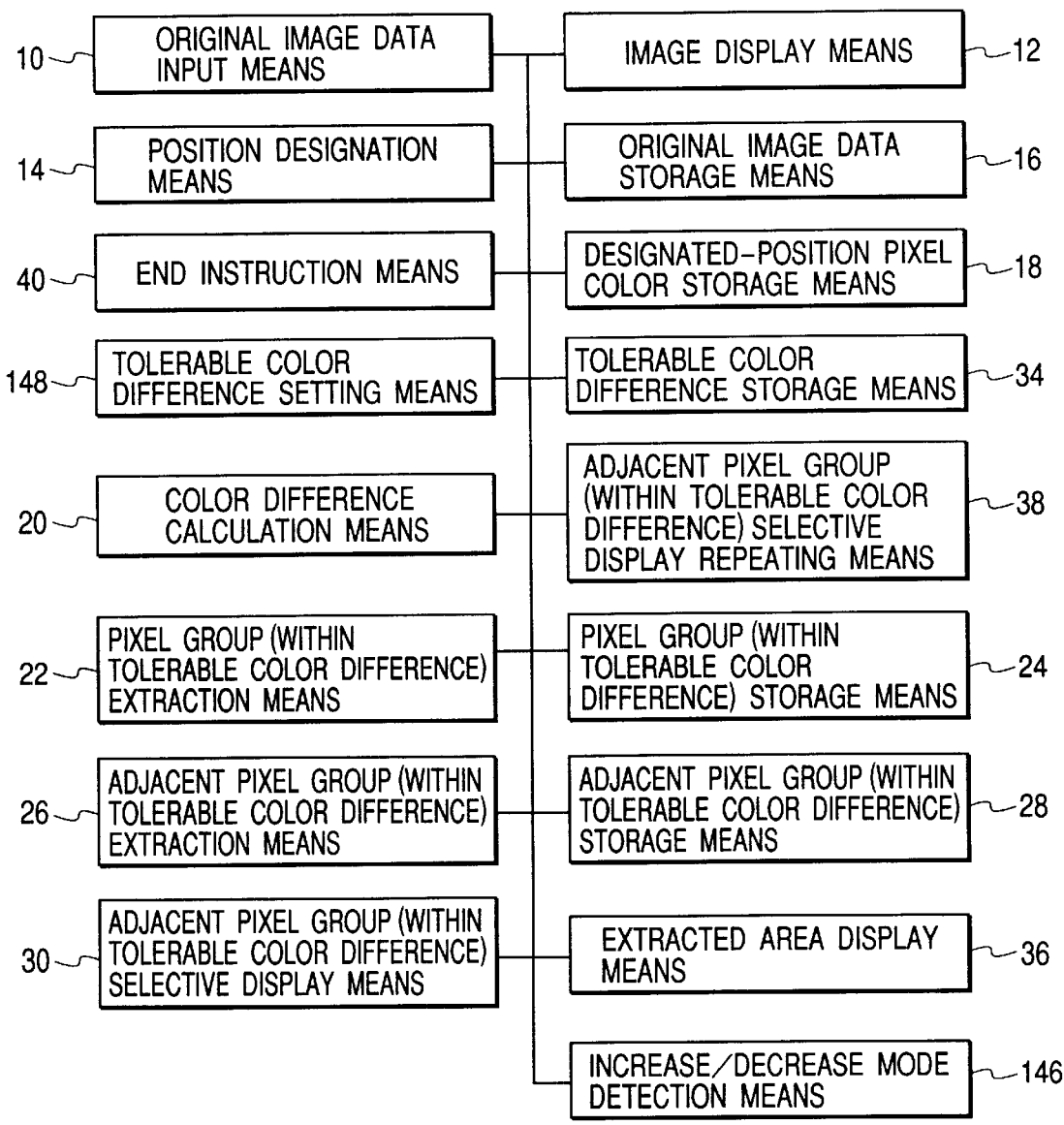
FIG. 22 is a schematic block diagram of a fourth embodiment of the present invention.

FIG. 22 is a schematic block diagram of a fourth embodiment, wherein components same as those in FIG. 1 are represented by same numbers. Increase/decrease mode detection means 146 detects whether the user instructs an increase mode or a decrease mode in which the tolerable color difference in the tolerable color difference setting means 148 increases or decreases. In response to the mode detected by the increase/decrease mode detection means 146, the tolerable color difference setting means 148 increases or decreases the tolerable color difference respectively in the increase or decrease mode. Therefore the user can arbitrarily designate the direction of movement of the boundary of the extracted area. For example the decrease mode or the increase mode is selected respectively when the shift key on the keyboard is depressed or not. Naturally there may be employed another key or a mode switching button displayed on the image.

FIG. 23 shows the memory map of the main memory 76 in case the embodiment shown in FIG. 22 is applied to the computer shown in FIG. 3, wherein components same as those in FIG. 4 are represented by same numbers. An area 150 stores an increase/decrease mode detection program corresponding to the increase/decrease mode detection means 146. An area 152 stores information indicating the result of detection by the increase/decrease mode detection program, namely information indicating the increase or decrease mode. An area 154 stores a tolerable color difference setting program corresponding to the tolerable color difference setting means 148.

FIG. 24 is a flow chart showing the details of the tolerable color difference setting means 148 or the program corresponding thereto. At first the tolerable color difference G is acquired by referring to the tolerable color difference storage area 100 (S111). Then executed is the mode detection program stored in the area 150, and the mode information obtained by such mode detection is stored in the mode storage area 152 (S112).

Then the mode storage area 152 is referred to, and, if the current mode is the increase mode (S113), the current tolerable color difference increased by 1 is taken as the new tolerable color difference G (114), but, if the current mode is the decrease mode (S115), the current tolerable color difference decreased by 1 is taken as the new tolerable color difference G (S115). The new tolerable color difference G is stored in the tolerable color difference storage area 100 and the sequence is terminated (S116).

Figure 25:
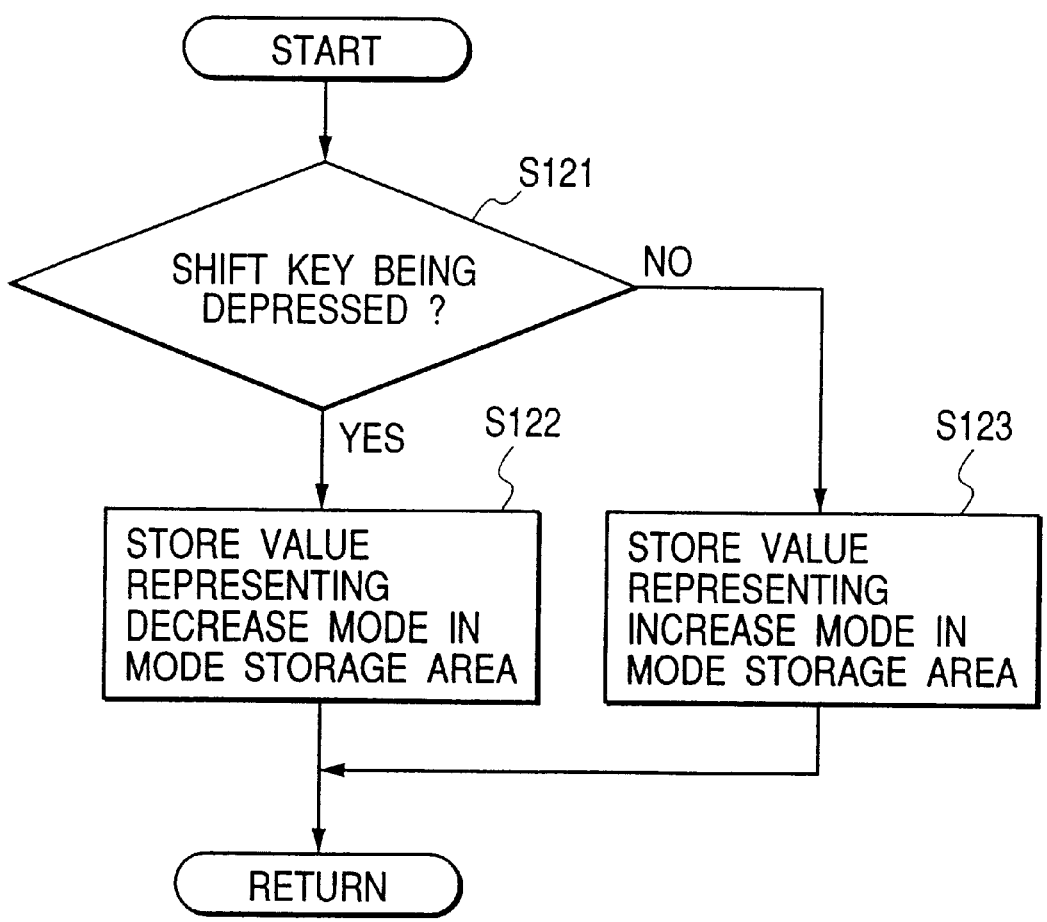
FIG. 25 is a flow chart of a mode detection program.

FIG. 25 is a flow chart showing the mode detection program stored in the area 150. There is discriminated whether the shift key of the keyboard is being depressed, by inquiring to the operating system (S121). If the shift key is depressed (S121), a value (for example 0) indicating the decrease mode is stored in the mode storage area 152 (S122), but, if the shift key is not depressed (S121), a value (for example 1) indicating the increase mode is stored in the mode storage area 152 (S123).

In the fourth embodiment, as explained in the foregoing, if the user selects the increase mode or the decrease mode, the tolerable color difference setting means so selects the tolerable color difference as to respectively have a positive or negative correlation with respect to the number Z of repetition of the adjacent pixel group (within tolerable color difference) selective display process. Thus, in the extraction of the concerned area, it is rendered possible to execute the extraction initially in the increase mode to bring the boundary of the extracted area toward that of the concerned area, and, even in case of an error in instructing the end of the repetition of the adjacent pixel group (within tolerable color difference) selective display step, to easily restore the preferred selection state by immediately switching to the decrease mode and restarting the extraction of the concerned area, whereby the extraction of the concerned area can be achieved in an easier manner.

Figure 26:
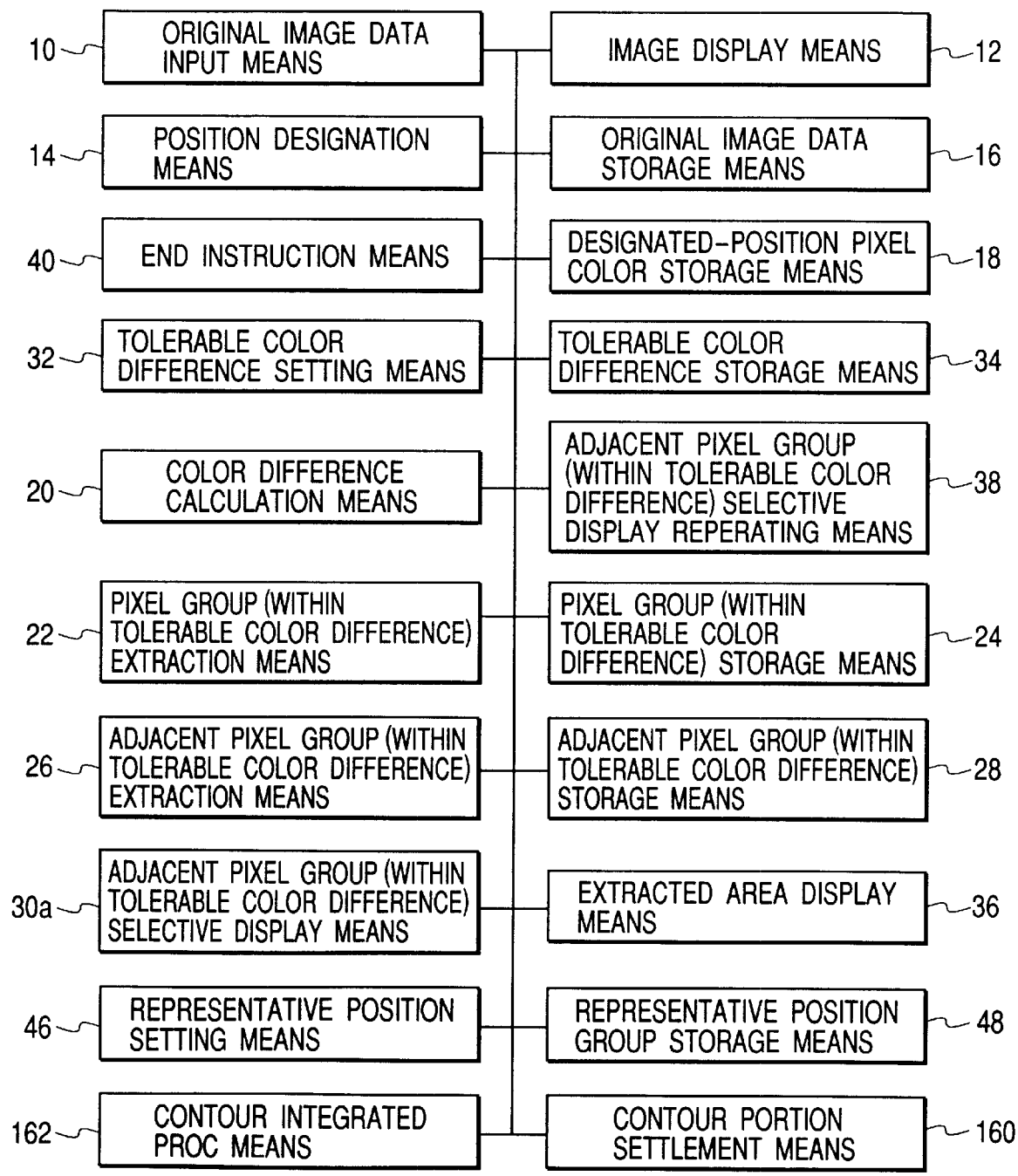
FIG. 26 is a schematic block diagram of a fifth embodiment of the present invention.

FIG. 26 is a schematic block diagram of a fifth embodiment, wherein components same as those in FIG. 16 are represented by same numbers. In this embodiment, in addition to the configuration of the third embodiment shown in FIG. 16, there are provided contour portion settlement means 160 and contour integrated process means 162.

The contour portion settlement means 160 settles the boundary line to be finally adopted, by selecting a certain number of lines constituting portions of the boundary of the extracted area, by mouse instructions corresponding to the manual operations of the user. The plural line portions thus settled are integrated by the contour integrated process means 162 to obtain an integrated contour. The representative position group is extracted from such contour and is processed as in the embodiment shown in FIG. 16 to extract the concerned area.

Figure 27:
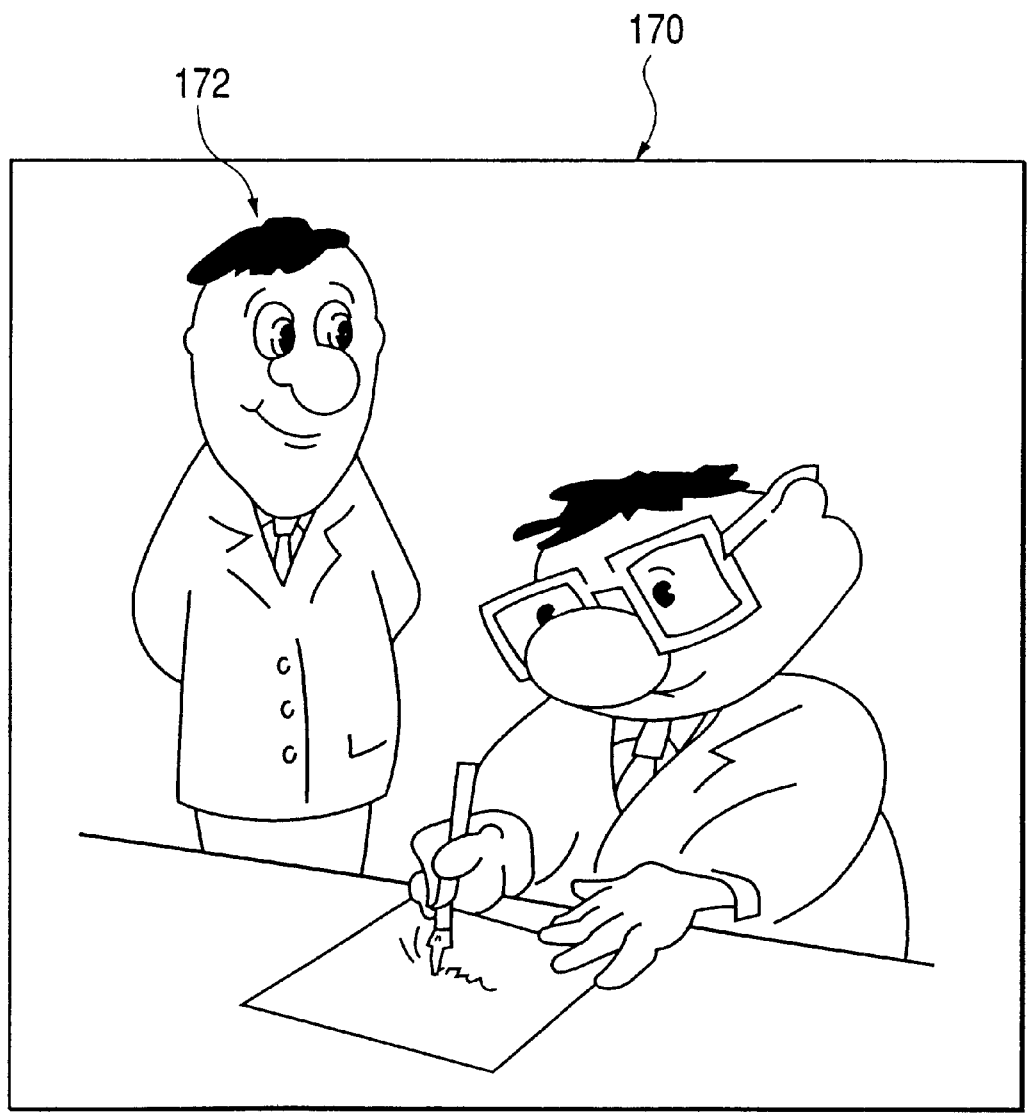
FIG. 27 is a view showing an example of the image in the embodiment shown in FIG. 26.
Figure 28:
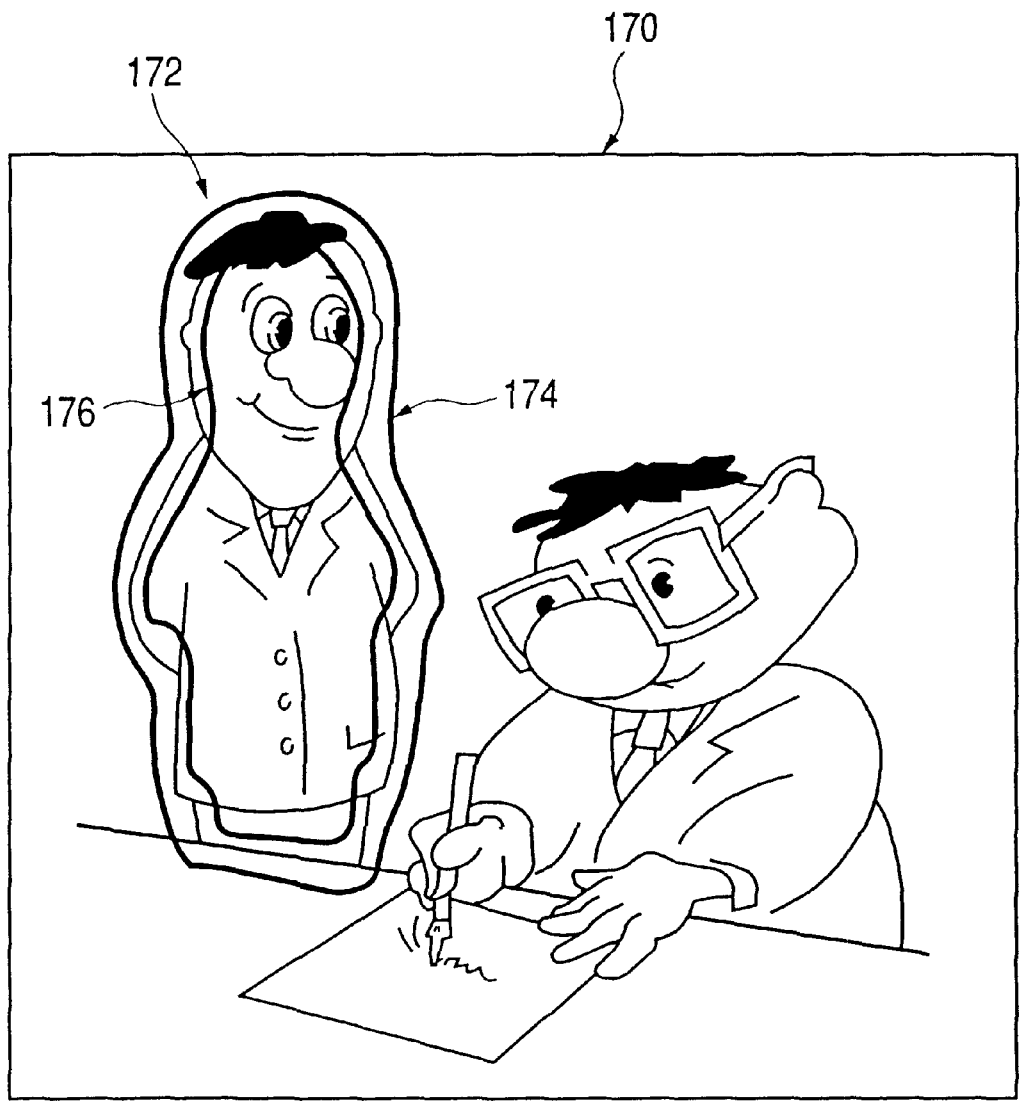
FIG. 28 is a view showing a state of input of a line into the image shown in FIG. 27.

FIGS. 27 and 28 show an example of line input in the present embodiment. In case of extracting an area of the person 172 from the original image 170 shown in FIG. 27 in the present embodiment, there are entered a line 174 roughly surrounding the person 172 and a closed loop line 176 inside the boundary of the person 172.

After the input of the lines 174, 176, there is executed the extraction of the concerned area as in the third embodiment. However, in the example shown in FIG. 27, positions adequate as the designated position are present outside and inside the person 172. In case of line input illustrated in FIG. 28, the result of extraction from the representative position obtained from the outside closed loop 174 coincides exactly with the boundary of the person 172 in a certain portion, and the result of extraction obtained from the inside closed loop 176 coincides exactly with the boundary of the person 172 in another portion. Consequently the concerned area can be extracted more easily and more securely by executing the contour portion setting process and the contour line integrating process after the input of the lines.

The foregoing embodiments may also be applied to a system consisting of plural equipment or an apparatus consisting of a single equipment (such as a copying machine or a facsimile apparatus).

Also the foregoing embodiments include a case where the program codes of a software realizing the aforementioned embodiments are supplied to the computer of a system or an apparatus connected to various devices so as to realize the functions of the aforementioned embodiments and the functions of the aforementioned embodiments are realized by a computer (CPU or MPU) of the above-mentioned system or apparatus by operating such devices according to the supplied program codes.

In such case the program codes themselves of the software realize the functions of the aforementioned embodiments, and the program codes themselves and the memory medium storing the program codes constitutes the present invention. The memory medium storing such program codes can be, for example, a floppy disk, a hard disk, an optical disk, a magnetooptical disk, a CD-ROM, a CD-R, a magnetic tape, a non-volatile memory card or a ROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the foregoing embodiments.

The present invention further includes a case wherein the supplied program codes are once stored in a memory provided in a function expansion board inserted into the computer or a function expansion unit connected thereto, and a CPU provided in the function expansion board or the function expansion unit executes all the process or a part thereof according to the instructions of such program codes, thereby realizing the functions of the aforementioned embodiments.

As will be easily understood from the foregoing description, the extraction of the concerned area can be easily and securely achieved even by the user who is not used to the image processing for the image for which the estimation of tolerable color difference is difficult.

What is claimed is:

1. An image processing method comprising:
   a designation step of designating a position on an image;
   a setting step of setting a tolerable color difference;
   an area extracting step of extracting an area consisting of pixels that are adjacent to the designated position and have a color that is within the tolerable color difference with respect to the color of the image at the designated position;
   an extraction state display step of selectively displaying the pixels within the tolerable color difference including the pixel of the designated position on a display unit; and
   a control step of repeating said area extracting step by repeatedly varying the set tolerable color difference while input of an operator continues,
   wherein the area extracted in said area extracting step gradually becomes wider while the input of the operator continues.

2. An image processing method according to claim 1, wherein said designation step is executed by a manual operation of the operator and is adapted to designate a color on said image.

3. An image processing method according to claim 1, wherein said setting step is adapted to set value, calculated from the number of repetitions of said control step, as a new tolerable color difference.

4. An image processing method according to claim 1, further comprising a varying direction designation step of designating the varying direction of the tolerable color difference set in said setting step.

5. An image processing method according to claim 4, wherein said varying direction is varied manually.

6. An image processing method according to claim 1, wherein the tolerable color difference is gradually varied according to an elapsed time of the operator's input.

7. An image processing method according to claim 1, wherein said designation step is adapted to designate a line, and said position is plural positions constituting said line.

8. An image processing apparatus comprising:
   designation means for designating a position on an image;
   setting means for setting a tolerable color difference;
   area extracting means for extracting an area consisting of pixels that are adjacent to the designated position and have a color that is within the tolerable color difference with respect to the color of the image at the designated position;
   extraction state display means for selectively displaying the pixels within the tolerable color difference including the pixel of the designated position on a display unit; and control means for activating said area extracting means in repeated manner to vary the set tolerable color difference while the input of an operator continues, wherein the area extracted by said area extracting means gradually becomes wider while the input of the operator continues.

9. An image processing apparatus according to claim 8, wherein said designation step is executed by a manual operation of the operator and is adapted to designate a color on said image.

10. An image processing apparatus according to claim 8, wherein said setting means is adapted to set a value, calculated from the number of repetitions of activation by said control means, as a new tolerable color difference.

11. An image processing apparatus according to claim 8, further comprising varying direction designation means for designating the varying direction of the tolerable color difference set by said setting means.

12. An image processing apparatus according to claim 11, wherein said varying direction is varied manually.

13. An image processing apparatus according to claim 8, wherein the tolerable color difference is gradually varied according to an elapsed time of the operator's input.

14. An image processing apparatus according to claim 8, wherein said designation means is adapted to designate a line, and said position is plural positions constituting said line.

15. A computer readable memory medium storing a program of an image processing method comprising:

a designation step of designating a position on an image;

a setting step of setting a tolerable color difference;

an area extracting step of extracting an area consisting of pixels that are adjacent to the designated position and have a color that is within the tolerable color difference with respect to the color of the image at the designated position;

an extraction state display step of selectively displaying pixels within the tolerable color difference including the pixel of the designated position on a display unit; and a control step of repeating said area extracting step by repeatedly varying the set tolerable color difference while the input of an operator continues, wherein the area extracted in said area extracting step gradually becomes wider while the input of the operator continues.

16. A computer readable memory medium storing a program of an image processing method according to claim 15, wherein said designation step is executed by a manual operation of the operator and is adapted to designate a color on said image.

17. A computer readable memory medium storing a program of an image processing method according to claim 15, wherein said setting step is adapted to set a value, calculated from the number of repetitions of said control step, as a new tolerable color difference.

18. A computer readable memory medium storing a program of an image processing method according to claim 15, further comprising a varying direction designation step of designating the varying direction of the tolerable color difference set in said setting step.

19. A computer readable memory medium storing a program of an image processing method according to claim 18, wherein said varying direction is varied manually.

20. A computer readable memory medium storing a program of an image processing method according to claim 15, wherein the tolerable color difference is gradually varied according to an elapsed time of the operator's input.

21. A computer readable memory medium storing a program of an image processing method according to claim 15, wherein said designation step is adapted to designate a line, and said position is plural positions constituting said line.

* * * * *

UNITED STATES PATENT AND TRADEMARK OFFICE
CERTIFICATE OF CORRECTION

PATENT NO.   : 6,606,407 B1
DATED        : August 12, 2003
INVENTOR(S)  : Fumiaki Takahashi et al.

It is certified that error appears in the above-identified patent and that said Letters Patent is hereby corrected as shown below:

<u>Title page,</u>
Item [57], ABSTRACT,
Line 19, "execution." should read -- execution --; and
Line 20, delete "The means and repeat the execution".

<u>Column 1,</u>
Line 39, "following" should read -- following, --.

<u>Column 2,</u>
Line 65, "chat" should read -- chart --.

<u>Column 8,</u>
Line 5, "increase" should read -- increased --.

<u>Column 10,</u>
Line 35, "Also" should read -- Also, --.

<u>Column 15,</u>
Line 38, "Consequently" should read -- Consequently, --; and
Line 46, "Also" should read -- Also, --.

<u>Column 17,</u>
Line 36, "displaying" should read -- displaying the --.

Signed and Sealed this

Twenty-third Day of March, 2004

JON W. DUDAS
*Acting Director of the United States Patent and Trademark Office*